US012163718B2

(12) United States Patent
Notaney et al.

(10) Patent No.: US 12,163,718 B2
(45) Date of Patent: Dec. 10, 2024

(54) DEVICES FOR PLANING CLEAR ICE PRODUCTS AND RELATED METHODS

(71) Applicant: Abstract Ice, Inc., Petaluma, CA (US)

(72) Inventors: Ashok Kumar Notaney, San Francisco, CA (US); Todd Stevenson, Novato, CA (US); Andrew James Whalen, Windsor, CA (US); Bryce Edmund Peterson, Hayward, CA (US); Luke W. Clauson, Reno, NV (US)

(73) Assignee: Abstract Ice, Inc., Novato, CA (US)

( * ) Notice: Subject to any disclaimer, the term of this patent is extended or adjusted under 35 U.S.C. 154(b) by 0 days.

(21) Appl. No.: 18/253,706

(22) PCT Filed: Nov. 19, 2021

(86) PCT No.: PCT/US2021/060037
§ 371 (c)(1),
(2) Date: May 19, 2023

(87) PCT Pub. No.: WO2022/109235
PCT Pub. Date: May 27, 2022

(65) Prior Publication Data

US 2024/0011693 A1 Jan. 11, 2024

Related U.S. Application Data

(60) Provisional application No. 63/276,508, filed on Nov. 5, 2021, provisional application No. 63/116,453, filed on Nov. 20, 2020.

(51) Int. Cl.
*F25C 5/14* (2006.01)
*B28D 1/20* (2006.01)

(52) U.S. Cl.
CPC . *F25C 5/14* (2013.01); *B28D 1/20* (2013.01)

(58) Field of Classification Search
CPC ..... F25C 5/12; F25C 5/14; F25C 5/04; B28D 1/20; F25D 25/04; F25D 3/127
See application file for complete search history.

(56) References Cited

U.S. PATENT DOCUMENTS 329,400 A * 10/1885 Loring et al. ............ B28D 1/20 144/132
370,928 A 10/1887 Carsley
(Continued)

FOREIGN PATENT DOCUMENTS

CN 206281268 U 6/2017
WO 2006127867 A2 11/2006
WO 2019183327 A1 9/2019

OTHER PUBLICATIONS

International Search Report re PCT/US21/60037 mailed Mar. 16, 2022 (4 pages).
(Continued)

*Primary Examiner* — Joseph F Trpisovsky
(74) *Attorney, Agent, or Firm* — Aurora Consulting LLC; Kristen J. Hansen; Ashley Sloat

(57) ABSTRACT

Methods and devices for planing ice are described that include at least receiving, at a planing apparatus, an elongate ice ingot, feeding the elongate ice ingot at a configurable rate through an opening in a cutterhead assembly of the planing apparatus, and planing, by the cutterhead assembly, a plurality of surfaces of the elongate ice ingot at a predefined depth as the elongate ice ingot is fed linearly through the opening of the cutterhead assembly. The planing may result in a planed ice ingot.

21 Claims, 22 Drawing Sheets

(56) References Cited

U.S. PATENT DOCUMENTS

| | | | | | |
|---|---|---|---|---|---|
| 482,206 | A * | 9/1892 | Smith | B28D 1/20 | 125/9 |
| 1,529,972 | A | 3/1925 | Uline | | |
| 1,707,847 | A * | 4/1929 | Edel | F25C 5/14 | 125/13.01 |
| 2,129,116 | A * | 9/1938 | Buffehr | B23D 45/102 | 83/435.2 |
| 2,153,438 | A * | 4/1939 | Sheldon | F25C 5/14 | 83/508.1 |
| 2,156,247 | A | 4/1939 | Smith | | |
| 2,169,133 | A * | 8/1939 | Barr | B23D 45/102 | 62/340 |
| 2,238,805 | A * | 4/1941 | Dotterweich | B23D 45/102 | 83/878 |
| 3,491,807 | A * | 1/1970 | Underwood | F25C 5/14 | 83/423 |
| 4,192,151 | A | 3/1980 | Carpenter | | |
| 4,767,239 | A | 8/1988 | Erwin | | |
| 5,038,573 | A | 8/1991 | McAllister | | |
| 5,189,939 | A * | 3/1993 | Allen, Jr. | A23L 3/363 | 83/885 |
| 5,460,068 | A * | 10/1995 | Gwosdz | F25C 5/02 | 83/425.3 |
| 6,328,236 | B1 * | 12/2001 | Upson | F25C 5/12 | 241/95 |

OTHER PUBLICATIONS

Written Opinion re PCT/US21/60037 mailed Mar. 16, 2022 (6 pages).

Extended European Search Report dated Sep. 23, 2024 re EP 218956506 (11 pages).

* cited by examiner

DEVICES FOR PLANING CLEAR ICE PRODUCTS AND RELATED METHODS

CROSS-REFERENCE TO RELATED APPLICATIONS

This application is a 35 U.S.C. 371 National Stage Application of PCT/US2021/60037, filed Nov. 19, 2021, which claims the priority benefit of U.S. Provisional Application No. 63/276,508, filed on Nov. 5, 2021, and the priority benefit of U.S. Provisional Application No. 63/116,453, filed on Nov. 20, 2020, the disclosures of each of which are herein incorporated by reference in their entireties.

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of ice manufacturing, and more specifically to the field of clear ice manufacturing. Described herein are devices and methods for planing ice.

BACKGROUND

From the end of the prohibition era to modern day, craft cocktails remain a mainstay in most restaurants and bars. To enhance the overall experience, some restaurants and bars add garnishes and/or specialty ice to the cocktails. Currently, these restaurants and bars buy large blocks of ice that are then cut down in-house to the appropriate size for each drink.

However, ice can crack under a variety of circumstances experienced during or after a freezing process. Sometimes, during the freezing process, when the exterior of the ice freezes first and then further cools during subsequent freezing, interior tension in the ice is created. This interior tension causes cracking of the ice when it exceeds a certain threshold (e.g., about 1 MPa). Unclear ice may result from super cooling. improper ice freezing techniques and equipment result in less-than-ideal ice for the booming craft cocktail industry. Thus, there is a need for new and useful devices and methods for manufacturing and processing ice.

SUMMARY

In a first general aspect, a method is described for planing ice. The method may include receiving, at a planing apparatus, an elongate ice ingot, feeding the elongate ice ingot at a configurable rate through an opening in a cutterhead assembly of the planing apparatus, and planing, by the cutterhead assembly, a plurality of surfaces of the elongate ice ingot at a predefined depth as the elongate ice ingot is fed linearly through the opening of the cutterhead assembly. The planing may result in a planed ice ingot.

Particular implementations of the method may include any or all of the following features. In some embodiments, the method may further include during the planing of the elongate ice ingot, expelling ice chips, generated by planing the elongate ice ingot, by vacuuming the ice chips into a collection container, the collection container being configured to melt the ice chips and remove resulting water from the collection container via a drain.

The cutterhead assembly may include at least a first helical cutterhead configured to cut a top plane of the elongate ice ingot, a second helical cutterhead configured to plane a first side plane of the elongate ice ingot, a third helical cutterhead configured to plane a bottom plane of the elongate ice ingot, and a fourth helical cutterhead configured to plane a second side plane of the elongate ice ingot.

In some embodiments, the planing of the top plane, the bottom plane, the first side plane, and the second side plane is performed simultaneously as the elongate ice ingot is fed through the cutterhead assembly. In some embodiments, the predefined depth planed from one or more of the plurality of surfaces of the elongate ice ingot is about 0.5 millimeters to about 6 millimeters. In some embodiments, the planing of the elongate ice ingot is performed in an environment with an air temperature at or below zero degrees Celsius. In some embodiments, planing the plurality of surfaces results in an ice ingot with at least four planar surfaces, each planar surface being substantially perpendicular to a respective adjacent planar surface. In some embodiments, planing the plurality of surfaces results in an ice ingot with at least four planar surfaces shaped to form a parallelogram. In some embodiments, planing the plurality of surfaces of the elongate ice ingot comprises cutting, with the cutterhead assembly, each of the plurality of surfaces to an adjustable depth.

In a second general aspect, an article of ice is generated by the planing according to the method of claim 1.

In a third general aspect, an ice planing apparatus is described. The apparatus includes an infeed assembly configured with an infeed drive means to guide movement of an ice ingot through a cutterhead assembly, the cutterhead assembly comprising a plurality of cutterheads configured to plane a plurality of surfaces of the ice ingot, an outfeed assembly spaced from the infeed assembly with the cutterhead assembly mounted therebetween. The outfeed assembly may be configured with an outfeed drive means to guide movement of a planed version of the ice ingot from the cutterhead assembly. The apparatus may also include an adjuster means for adjusting the cutterhead assembly to control a depth of planing of the ice ingot on one or more of the plurality of surfaces.

Particular implementations of the apparatus may include any or all of the following features. In some embodiments, the plurality of cutterheads comprise at least a first helical cutterhead configured to cut a top surface of the ice ingot, a second helical cutterhead configured to plane a first side surface of the ice ingot, a third helical cutterhead configured to plane a bottom surface of the ice ingot, and a fourth helical cutterhead configured to plane a second side surface of the ice ingot.

In some embodiments, the first helical cutterhead and the third helical cutterhead may be fixed to a support frame of the ice planing apparatus. The second helical cutterhead and the fourth helical cutterhead may be configured to be movably located within the ice planing apparatus according to a size of the ice ingot. In some embodiments, the apparatus further includes an ice chip collection system configured to remove ice chips from the cutterhead assembly during planing of the ice ingot, the ice chip collection system comprising at least, and a vacuum system with a vacuum pipe having a first end fixedly connected to a cyclonic separator and a second end seated adjacent to the cutterhead assembly. The apparatus may also include at least one electronic control to operate the vacuum. In some embodiments the ice chip collection system further comprises a collection container at least partially filled with a liquid, the collection container fixedly connected to the cyclonic separator, a water supply, and a drain configured to drain the collection container.

In some embodiments, the infeed assembly houses the ice ingot on a planar surface that is tilted from a normal axis of a working surface used for operating the ice planing apparatus thereon. In some embodiment, the infeed assembly further includes an enclosure comprising at least one moveable door for receiving the ice ingot therethrough and at least one bar feeder assembly configured to push the ice ingot along a planar surface of the infeed assembly into the cutterhead assembly, the at least one bar feeder assembly being at least a length of the infeed assembly, and at least one backstop mechanism configured to exert a force on the ice ingot to maintain a position of the ice ingot between the at least one backstop mechanism and the at least one bar feeder assembly. In some embodiments, the infeed assembly is configured to receive ice ingots that measure about 0.6 meters to about 2 meters.

In a fourth general aspect, an ice planing apparatus is described. The apparatus may include a cutting assembly configured to plane a plurality of surfaces of an ice ingot, the cutting assembly having a plurality of cutterheads mounted to a support form of the ice planing apparatus where the cutting assembly being arranged with a through aperture to receive the ice ingot. The apparatus may also include a delivery means to deliver the ice ingot to the cutting assembly and an adjuster means for adjusting the cutting assembly to control a depth of planing of the ice ingot on the plurality of surfaces. In some embodiments, the plurality of cutterheads may include a first cutterhead configured to cut a top surface of the ice ingot, a second cutterhead configured to plane a first side surface of the ice ingot, a third cutterhead configured to plane a bottom surface of the ice ingot, and a fourth cutterhead configured to plane a second side surface of the ice ingot. In some embodiments, the cutting assembly is further configured to etch the ice ingot on one or more of the plurality of surfaces.

In a fifth general aspect, a method is described for producing a hollow block of ice comprising selectively melting a portion of a first block of ice to form at least one cavity in the first block of ice, placing a second block of ice onto the first block of ice such that the at least one cavity is at least partially covered to form a stacked block of ice, and refreezing the stacked block of ice to form a hollow block of ice. In some embodiments, the method may further include draining liquid water from the at least one cavity. In some embodiments, the at least one cavity has a polygon shape, a circular shape, a diamond shape, a heart shape, or a clover shape.

In some embodiments, the method may be performed by a device for introducing inclusions into clear ice that may include a rigid substrate, at least one inclusion holder connected to the substrate adapted to secure an item in a predetermined position, wherein the inclusions holder comprises retraction mechanism and at least one of a skewer, hook, or clamp and wherein the retraction mechanism is adapted to disengage the item from an inclusion holder and retract the inclusion holder.

The details of one or more implementations are set forth in the accompanying drawings and the description below. Other features will be apparent from the description and drawings, and from the claims.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

Figure 1:
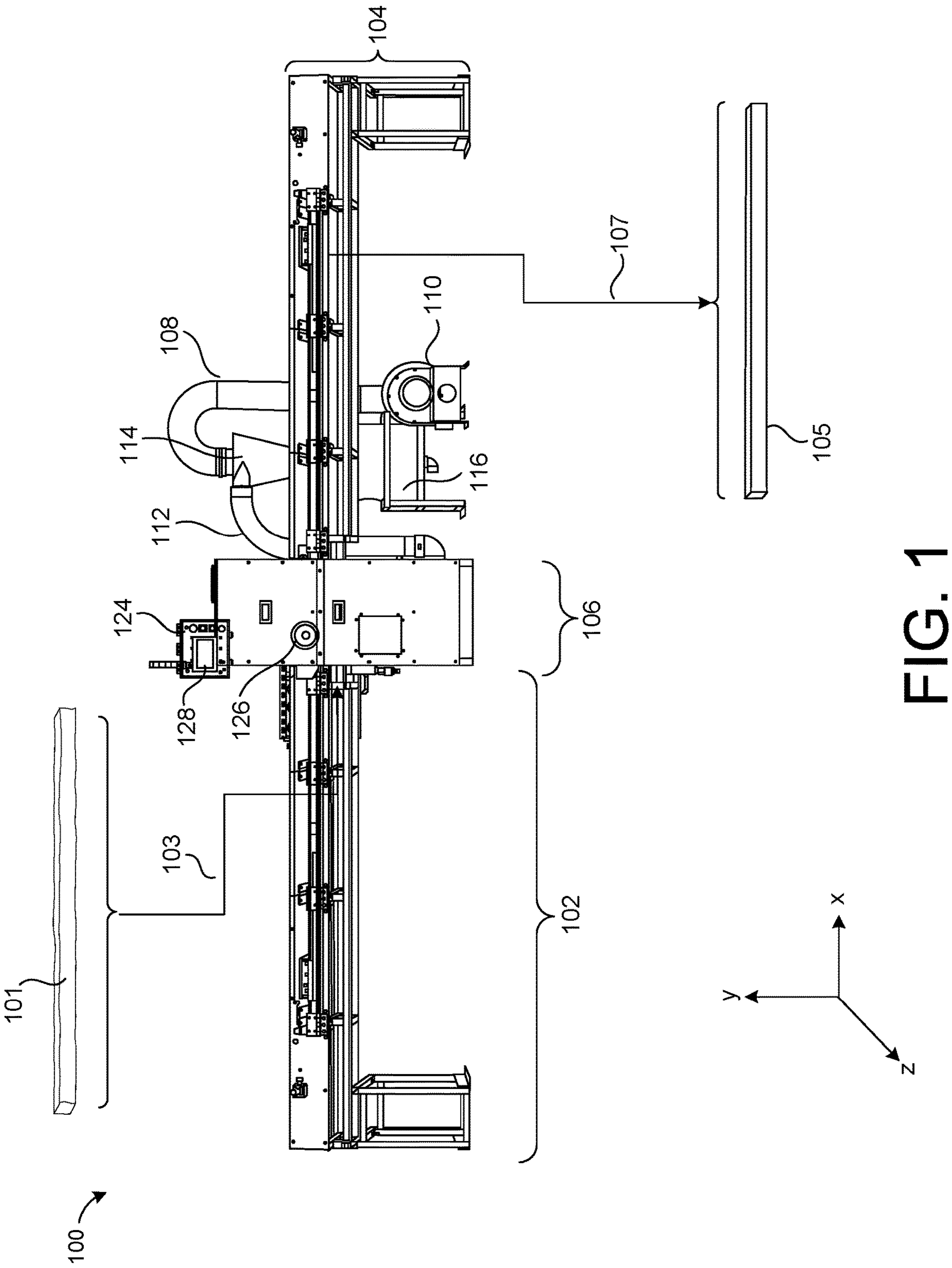
FIG. 1 illustrates a front view of an example planing device for planing an ingot of ice.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the contemplated invention(s). Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

It is an object of the present disclosure to describe devices, systems, and methods for cutting (e.g., planing) and/or etching ice ingots. For example, the devices, systems, and methods described herein may be configured to cut along planar surfaces of clear ice ingots. In some embodiments, the systems and methods described herein may plane or etch the ice ingot to prepare the ice ingot for additional processing before being cut into a variety of shapes that are ready for use. In some embodiments, the devices, systems, and methods described herein function to prepare ice ingots for cutting the ingots into a number of different shapes and sizes. An example preparation may include strategically planing portions (e.g., one or more surfaces) of the ice ingot using a cutting assembly with a number of cutterheads with blades, knives, etc.

This disclosure describes devices, systems, and methods for planing (e.g., cutting, slicing, shearing, etching, etc.) ice ingots along one or more surfaces. In general, the ice ingots that are planed by the devices, systems, and methods described herein are elongate ingots of ice generated by an ice making machine. The ice ingots may be fed into and/or otherwise received by the devices described herein in a clear, crystalline form. Because ice can be melted into water during processing, the components of the systems described herein are generally made of waterproof or water wicking materials. Components that are not waterproof may be protected by shrouds, coatings, and/or within waterproof casings that partially or wholly cover such components.

In some embodiments, the ice ingots planed by the devices described herein may measure about one meter to about four meters in length. In some embodiments, the ice ingots have a bottom surface, a first side surface, a second side surface, and a top surface and measure about 4 centimeters to about 10 centimeters in height on a side. In some embodiments, the ingots are cylindrical or semi-cylindrical and may have a radius of about 2 centimeters to about 5 centimeters. In some embodiments, the ice ingots are shorter in height than in width. In some embodiments, the ice ingots are taller in height than in width.

As used herein, the term "planing" or "planed" may include cutting, shearing, shaping, embossing, etching, shaving, or any other subtractive manufacturing approach (i.e., layer-by-layer removal of material from an ice solid) of producing ice having a desired shape, form, or appearance.

Planing one or more surfaces of an ice ingot may provide an advantage of forming elongated ice blocks with substantially orthogonal surfaces (i.e., about 90 degree angles for each corner moving between adjacent surfaces). Generating elongated ice ingots with substantially orthogonal surfaces ensures that resulting ice structures that are cut from the planed ice ingot also include substantially orthogonal surfaces. Thus, ice may be aesthetically uniform in shape.

The devices, systems, and methods described herein may be configured to feed an ice ingot through a cutterhead assembly and to an output area. During planing of the ice ingot in the cutterhead assembly, ice chips produced by the planing process may be removed from the cutting field via a vacuuming mechanism. The expelled ice chips may be vacuumed into a collection container. The collection container may be configured to melt the ice chips and remove resulting water from the collection container using a drain associated with the collection container. Removing ice chips from the cutting field can provide an advantage of maintaining an unmarred (e.g., undamaged, unblemished, etc.) ice surface. For example, ice chips that are not removed from the cutting field may cause ice chip re-adhering to ice surfaces. In addition, ice chips that are allowed to remain in the field may unexpectedly impact the ice surface when being cut from the ice ingot, which can cause surface flaws, cracks, and/or breaks in the ice ingot.

FIG. 1 illustrates a front view of an example planing device 100 for planing an ingot of ice ingot 101. The planing device 100 includes at least an infeed assembly 102, an outfeed assembly 104, and a planing assembly 106. In some embodiments, the planing device 100 spans a length of about 6 meters to about 7 meters in length to accommodate ice ingots of about one meter to about four meters in length. In some embodiments, the infeed assembly 102 and the outfeed assembly 104 each span a length of about 2 meters to about 3 meters. The planing assembly 106 is generally placed between the infeed assembly 102 and the outfeed assembly 104.

The infeed assembly 102 represents an enclosure for receiving one or more ice ingots (as shown by arrow 103) and feeding the ice ingots into the planing assembly 106 (e.g., for cutting the ice ingot 101 in a cutterhead assembly). Portions of the infeed assembly 102 may be removable or openable to allow for receiving ice ingots 101 within the enclosure. The infeed assembly 102 is configured with an infeed drive means to guide movement of the ice ingot 101 through the planing assembly 106.

The outfeed assembly 104 represents an enclosure for receiving planed (e.g., processed) ice ingots 105 (shown by arrow 107) from the planing assembly 102 as the processing (e.g., planing, cutting, etc.) is performed on the ice ingot 101. Portions of the outfeed assembly 104 may be removable or openable to remove planed ice ingots (e.g., ice ingot 105) after processing. The outfeed assembly 104 is also configured with an outfeed drive means to guide movement of the planed version of the ice ingot from the planing assembly 106.

The outfeed assembly 104 may be spaced from the infeed assembly 102 with the cutterhead assembly (within planing assembly 106) mounted therebetween. In some embodiments, the distance between the infeed assembly 102 (e.g., an infeed feed mechanism) and the outfeed assembly 104 (e.g., an outfeed mechanism with a backstop assembly) is adjustable via a pneumatic system to ensure the assemblies 102 and 104 may be extended or condensed to load larger or smaller ice ingot lengths.

In some embodiments, the infeed assembly 102 and the outfeed assembly 104 include at least one planar surface that is tilted from a normal axis (e.g., x-axis) of a working surface used for operating the planing device 100. The ice ingot (not shown) may be housed in the enclosure of the infeed assembly 102 at the tilted angle. The selected angle of tilt for either assembly 102 or assembly 104 may be selected to ensure that the ice ingot does not move laterally (e.g., about the y-axis) during processing operations of planing device 100.

The angle of tilt may be from about 5 degrees to about 20 degrees from a normal axis of the working surface used for operating the planing device 100. In some embodiments, the angle of tilt of the at least one planar surface in both the infeed assembly 102 and the outfeed assembly 104 is about 15 degrees tilted from a normal axis of a working surface for operating the planing device 100. In some embodiments, the tilt of the planar surface of the infeed assembly 102 is different than the tilt of the planar surface of the outfeed assembly 104.

The planing assembly 106 may include a cutterhead assembly (not shown) that may include a plurality of cutterheads configured to plane a plurality of surfaces of the ice ingot. In some embodiments, the cutterhead assembly may be configured to plane (e.g., cut) a single surface of the ice ingot. In some embodiments, the cutterhead assembly may be configured to plane (e.g., cut) at least two adjacent surfaces of the ice ingot. In some embodiments, the cutterhead assembly may be configured to plane (e.g., cut) at least two non-adjacent surfaces of the ice ingot. In some embodiments, the cutterhead assembly may be configured to plane all surfaces of the ice ingot. In some embodiments, the cutterhead assembly may be configured to plane (e.g., cut) three or more surfaces of the ice ingot.

The planing assembly 106 also includes an ice chip collection system 108 associated with a blower vacuum 110. The ice chip collection system 108 is configured to remove ice chips from the cutterhead assembly during planing of an ice ingot. For example, the system 108 may blow and/or vacuum ice chips to remove the ice chips from the ice ingot surfaces. In some embodiments, the blower vacuum 110 may be communicably coupled with one or more air nozzles mounted within a shroud associated with a cutterhead assembly (or an arbor assembly), the ice chip collection system 108, or pipes attached thereto in order to prevent buildup of ice chips in the cutterhead assembly.

The ice chip collection system 108 includes at least a blower vacuum 110 with a vacuum pipe 112 having a first end fixedly connected to a vortex separator or a cyclonic separator 114 and a second end seated adjacent to the cutterhead assembly (not shown). The ice collection system 108 also includes a collection container 116 at least partially filled with a fluid. In some embodiments, the fluid in the container 116 may include water or steam, which may function to melt the retrieved ice chips. In some embodiments, the fluid in the container 116 may be another heated liquid or gaseous fluid to dispose of (e.g., melt) the retrieved ice chips.

As shown, the collection container 116 is fixedly connected at junction 118 (FIG. 2) to the cyclonic separator 114, a water supply 120 (FIG. 2), and a drain 122 configured to drain the collection container 116. The ice collection system 108 also includes at least one electronic control (e.g., electrical control 124) to operate the blower vacuum 110. In operation, ice chips may be vacuumed via blower vacuum 110 and dropped from a cyclonic separator into the collection container 116. The collection container 116 may be adapted to melt the ice chips and plumb the resulting water into another pipe to remove the water from the container 116. In some embodiments, the resulting water is drained from collection container 116 using drain 122. In some embodiments, the container 116 includes one or more nozzles to automatically spray fluid into the ice chips as the ice chips are blown into the container via blower vacuum 110.

The planing assembly 106 may also include an adjuster means for adjusting the cutterhead assembly (not shown) to control a depth of planing of the ice ingot on one or more of the plurality of surfaces. For example, the planing assembly 106 may include an adjuster control 126. For example, the adjuster control 126 may be used to adjust a depth of a cut on one or more surfaces of the ice ingot.

As shown in FIG. 1, the adjuster control 126 is a hand wheel that may be turned to adjust portions of the cutterhead. For example, the adjuster control 126 may be turned to configure a depth of cut for two parallel cutterheads. In another example, the adjuster control 126 may be turned to configure depth of a cut for a single cutterhead. Although a single hand wheel is shown, any number of handwheels or like user input devices may be installed to adjust one or more cutterheads. In some embodiments, the adjustor control 126 may be electronically adjusted via control 124.

The planing assembly 106 also includes a control 124 that may display a user interface 128 to provide interactive content to a user with respect to operations associated with the device 100. In some embodiments, the user interface 128 includes configuration screens for configuring the device 100 to plane ice ingots. The configuration screens may be used to configure assemblies associated with device 100 and to configure dimensions for ice ingots that may be planed (e.g., cut, shaved) by device 100.

Figure 2:
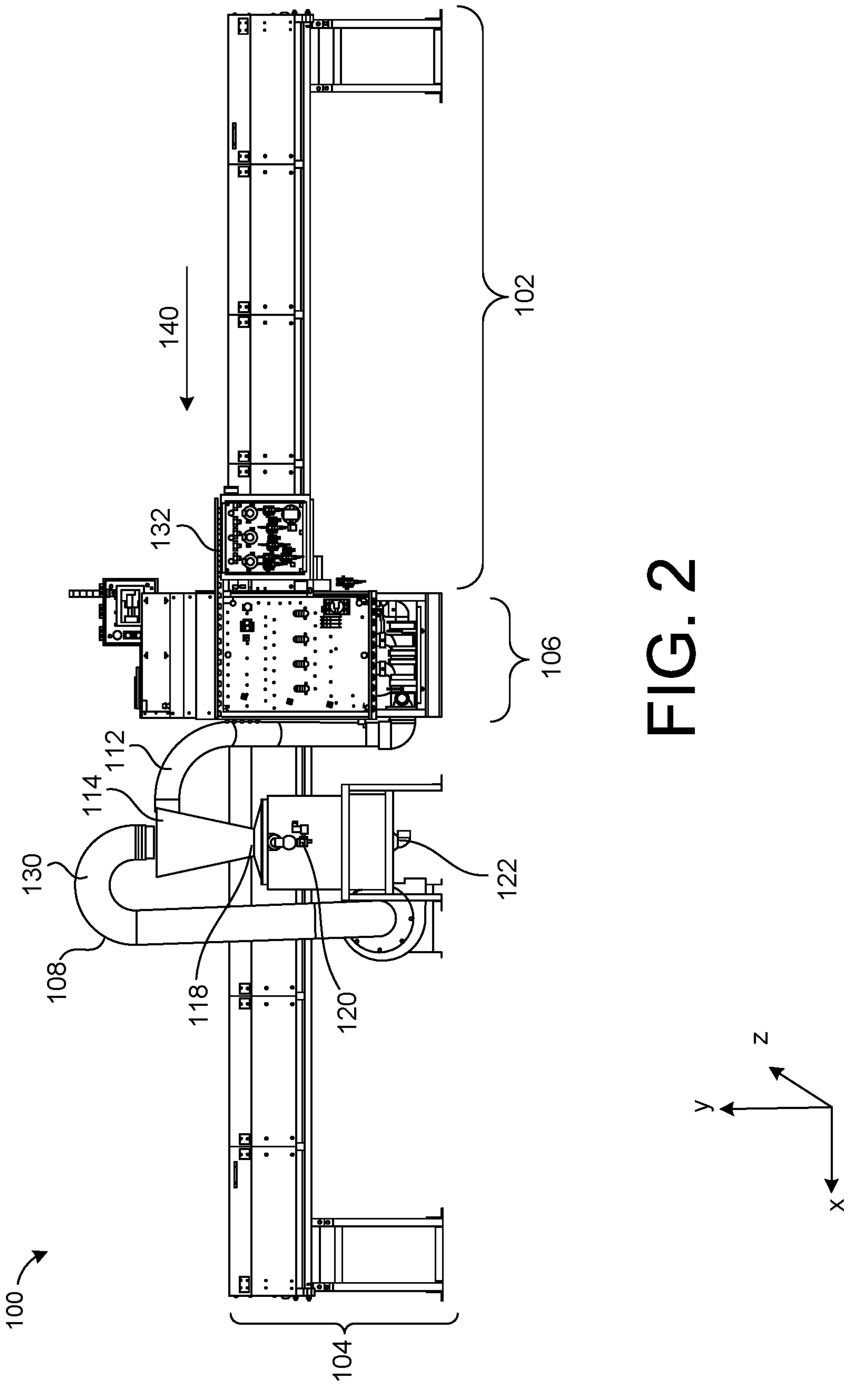
FIG. 2 is a rear view of an example planing device for planing an ingot of ice.

FIG. 2 is a rear view of the planing device 100 for planing an ingot of ice. The ice chip collection system 108 in FIG. 2 includes a front view of the ice chip collection system with pipe 130 fixedly connected to the blower vacuum 110 at a first end and to the cyclonic separator 114 at a second end. As shown, the planing assembly 106 also includes a pneumatics enclosure 132 with a power input and an electronics enclosure to operate device 100.

In operation of device 100, an ice ingot may be loaded into infeed assembly 102, pushed along infeed assembly 102 in the direction of arrow 140 and into planing assembly 106 for cutting of one or more surfaces of the ice ingot. The outfeed assembly 104 may receive the processed (e.g., cut) ice ingot. The processed ice ingot may then be sliced into individual ice structures (e.g., cubes, rectangles, etc.).

Figure 3:
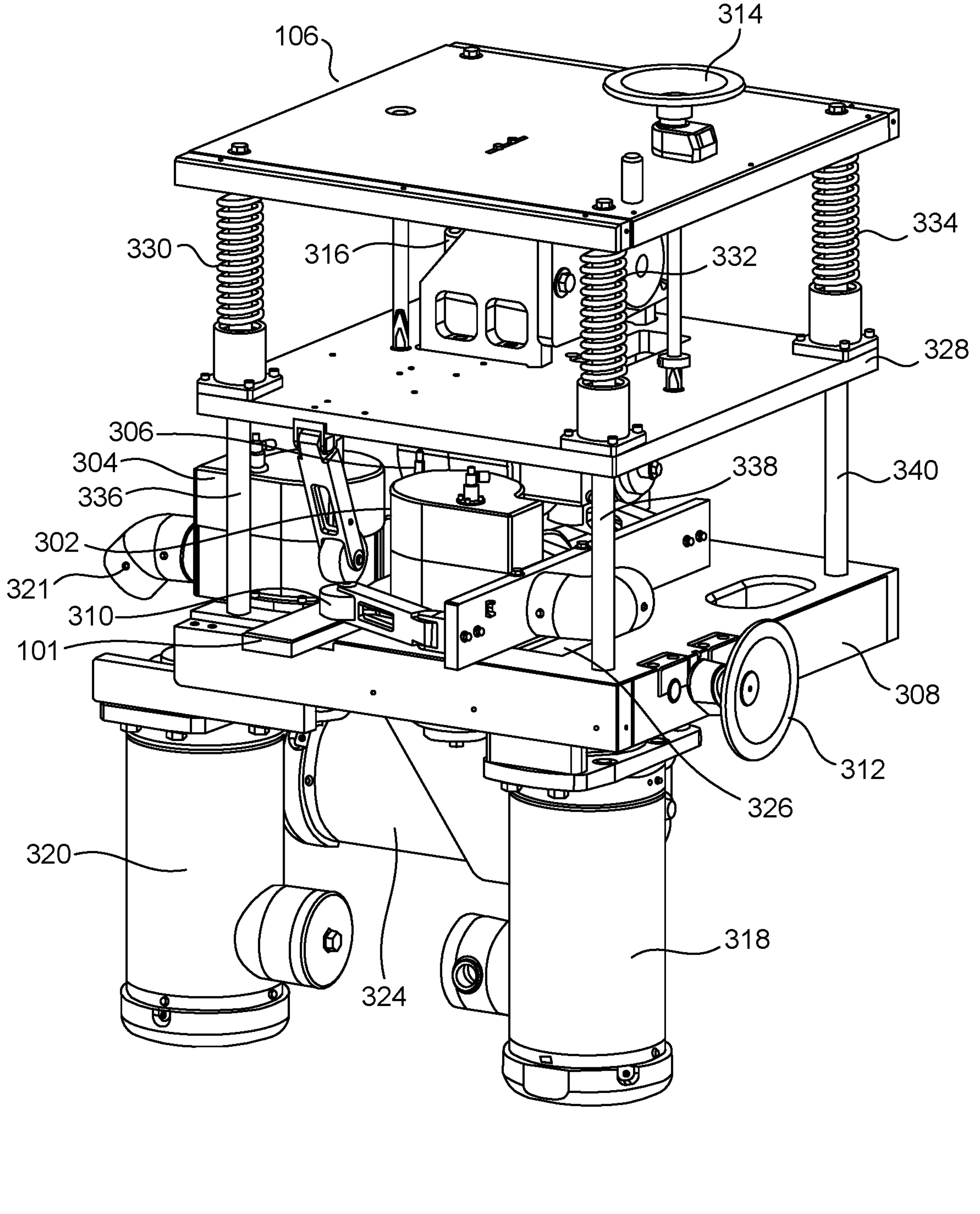
FIG. 3 is a perspective view of an example planing assembly of the planing device.

FIG. 3 is a perspective view of an example planing assembly 106 of the planing device 100. The planing assembly 106 includes at least a first cutterhead assembly 302, a second cutterhead assembly 304, and a third cutterhead assembly 306. A fourth cutterhead assembly (not shown) may also be included in the planing assembly 106. For example, the fourth cutterhead assembly may be installed parallel to cutterhead assembly 306 and located beneath support plane 308.

Each cutterhead assembly 302, 304, 306, etc. also includes at least an arbor assembly (not shown), a roller guide assembly (represented as roller guide assembly 310), and a horizontal adjustment assembly (represented by handwheel 312). In general, the cutterhead assemblies 302, 304, 306, etc. within the planing assembly 106 may operate in a gap between the infeed assembly 102 and the outfeed assembly 104. Each cutterhead assembly 302, 304, 306, etc. may include one or more cutterheads (e.g., blades, knives, etc.) configured to plane ice ingot surfaces. In some embodiments, each cutterhead assembly 302, 304, 306, etc., may be arranged to project at least one cutterhead toward and away from a workpiece (e.g., the ice ingot 101) placed within a through aperture formed between the cutterhead assemblies.

The roller guide assembly 310 may operate to constrain ice ingots during processing on device 100 to ensure the ice ingot remains in contact with guide surfaces of the planing assembly 106. The horizontal adjustment assembly 312 may operate to configure the cutterhead blade positions for horizontally cutting cutterheads with respect to a cutting depth associated with cutting the ingot 101.

The planing assembly 106 may include a number of roller guides (e.g., about two to about eight roller guides) to assist with moving (e.g., adjusting) platens or supports that are holding or moving ice ingots. The adjusting of the platens or supports (e.g., such as linear carriage 326) may be in a horizontal direction for roller guides (and associated cutterheads/arbor assemblies) configured with horizontal adjustment controls.

The arbor assembly (not shown) may operate to raise and lower the cutterheads (not shown). A motor may be configured to drive the arbor assembly via a belt, for example, to cause one or more cutterheads to rotate. For example, a motor 316 is shown for operating cutterhead assembly 306. Other motors and/or controls for cutterhead assemblies are shown at motor 318 for cutterhead assembly 302, a motor 320 for cutterhead assembly 304, and a motor 324 for a fourth cutterhead assembly that is located below support plane 308. The arbor assembly may also include an evacuation pipe (e.g., evacuation pipe 321 of cutterhead assembly 304) for directing shaved or planed ice chips out and away from a particular cutterhead.

A vertical adjustment assembly is also partially depicted in FIG. 3 and may operate to configure one or more cutterhead (e.g., blade) positions for performing vertical cuts at a particular cutting depth associated with cutting the ingot 101 on a top surface and/or a bottom surface. The adjustment assembly may be configured to adjust platens or supports in a vertical direction via a control (e.g., handwheel 314). The adjustment may be for roller guides (and associated cutterheads/arbor assemblies) configured with vertical adjustment controls.

The vertical adjustment assembly may include any number of linear guide rods and preload springs to function to move support platen 328 upward or downward in order to move the fourth cutterhead (of assembly 306) toward or away from ice ingot 101. For example, the vertical adjustment assembly may include a first preload spring 330, a second preload spring 332, a third preload spring 334, and a fourth preload spring (not shown). The first preload spring 330 may engage with a first lead screw attached to a control (e.g., handwheel 314) to move platen 328 upward or downward on linear guide rod 336. Similarly, the second preload spring 332 may engage with a second lead screw attached to the handwheel 314 to move platen 328 upward or downward on linear guide rod 338. In a similar fashion, the third preload spring 334 may engage a third lead screw attached to the handwheel 314 to move platen 328 upward or downward on linear guide rod 340. Additional preload springs and/or lead screws may be used to engage and move platen 328. The lead screws may be connected via a chain, for example. In general, the movement of the platen 328 may function to move a cutterhead (not shown, associated with assembly 306) toward or away from ice ingot 101 during processing (e.g., planing). In some embodiments, the movement of platen 328 may function to move any number of cutterheads toward or away from ice ingot 101 during processing.

Figure 4A:
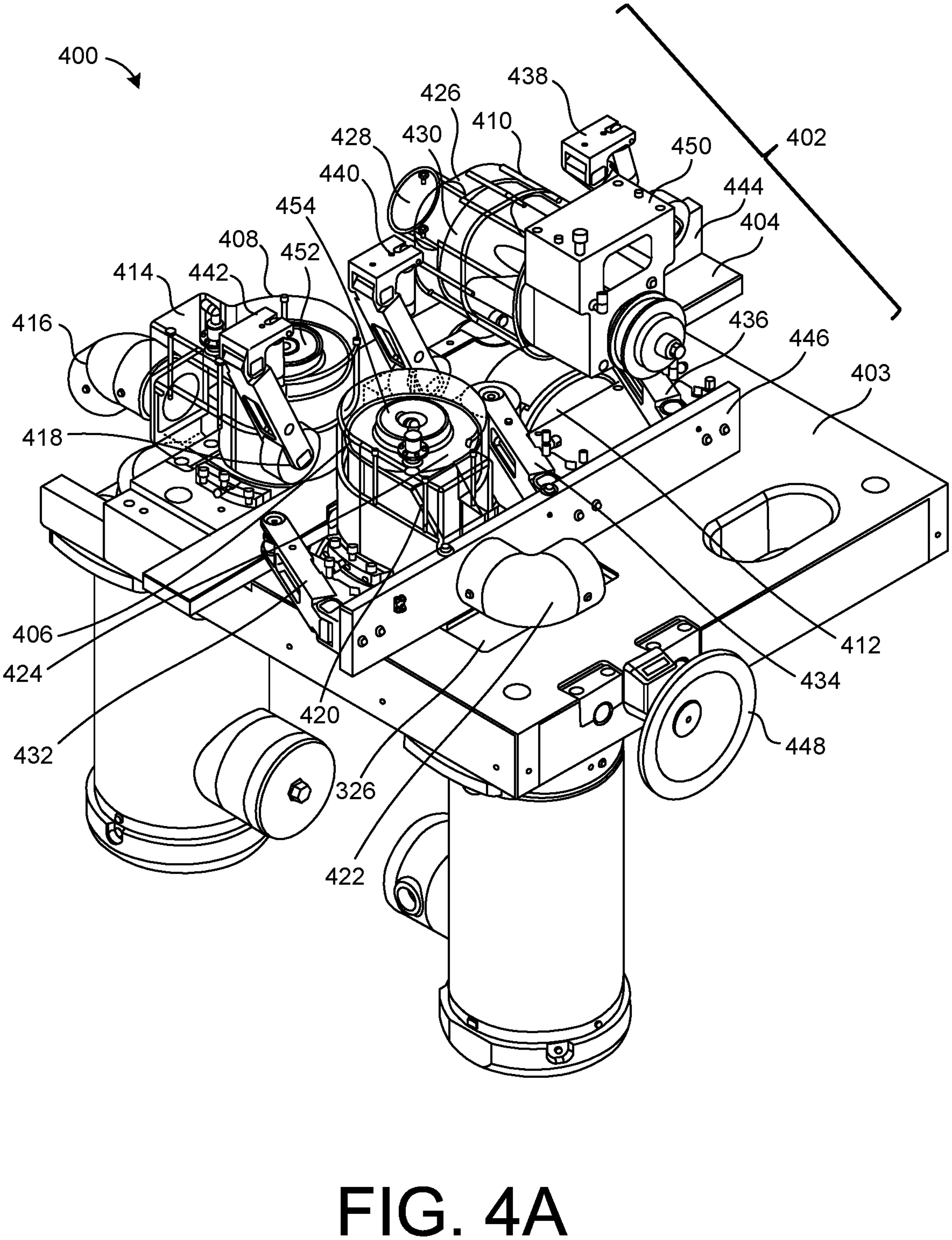
FIG. 4A is a perspective view of an example cutting assembly of the planing assembly of FIG. 3.

FIG. 4A is a perspective view 400 of an example cutting assembly 402 of the planing assembly 106 of FIG. 3. The cutting assembly 402 may be supported upon support platen 403 and/or attached to a top support surface (not shown). The cutting assembly 402 may be used to cut and/or otherwise plane one or more sides of an ice ingot that may be placed on surface 404. As shown, the cutting assembly 402 includes a plurality of cutterhead assemblies. For example, the cutting assembly 402 depicts a first cutterhead assembly 406, a second cutterhead assembly 408, a third cutterhead assembly 410, and a fourth cutterhead assembly (not shown in full, depicted here as cutterhead 412).

Each cutterhead assembly 406-412 may include at least an evacuation shroud, an evacuation pipe, and a cutterhead housing to fit one or more cutterheads. For example, cutterhead assembly 406 includes an evacuation shroud 414, an evacuation pipe 416, and a cutterhead housing 418 to fit one or more cutterheads (e.g., blades, knifes, etc.), such as shown by cutterhead 412. Similarly, the cutterhead assembly 406 includes an evacuation shroud 420, an evacuation pipe 422, and a cutterhead housing 424 to fit one or more cutterheads (e.g., blades, knifes, etc.), such as shown by cutterhead 412. Furthermore, the cutterhead assembly 410 also includes similar components including, but not limited to an evacuation shroud 426, an evacuation pipe 428, and a cutterhead housing 430 to fit one or more cutterheads (e.g., blades, knifes, etc.), such as shown by cutterhead 412.

The cutting assembly 402 also includes, for each cutterhead assembly 406-412, one or more roller guides to secure, position, and guide a workpiece (e.g., ice ingot placed on surface 404) through the cutterhead assemblies. As shown, the cutting assembly 402 includes a first roller guide 432, a second roller guide 434, a third roller guide 436, a fourth roller guide 438, a fifth roller guide 440, and a sixth roller guide 442. Although six roller guides 432-442 are depicted, any number of roller guides may be possible with assembly 402.

In some embodiments, a fence 444 may be included in cutting assembly 402, which functions to align and/or position the ice ingot placed on surface 404 during planing/cutting. In some embodiments, the fence 444 may function as a backstop to ensure a consistent position between the cutterhead assemblies 406-412 and the ice ingot placed on surface 404 is maintained.

In general, one or more of the roller guides may be associated with a roller support structure, such as support structure 446 for example roller guides 432, 434, and 436. Corresponding roller guides may be provided for corresponding cutterhead assemblies 408, 410, and 412.

The cutting assembly 402 may also include a horizontal adjustment mechanism 448 (e.g., a handwheel) for horizontally adjusting one or more of the cutterhead assemblies 406-412. For example, the horizontal adjustment mechanism 448 may be used to horizontally adjust cutterhead assembly 406 in a horizontal motion toward or away from cutterhead 408. Although a vertical adjustment mechanism (e.g., a handwheel) is not shown in FIG. 4A, a vertical adjustment mechanism may be provided for vertically adjusting the cutterhead assembly 410, for example, toward or away from cutterhead 412.

In addition, a number of supports may be provided to seat the cutting assembly 402 upon support platen 403 and below platen 328 (FIG. 3). For example, support 450 is shown attached to cutterhead assembly 410 for engaging with platen 328. Similarly, roller guides 438, 440, and 442 may also be configured to attach or otherwise engage with platen 328.

Each cutterhead assembly 406-412 may include at least one cutterhead (e.g., as shown by cutterhead 412). Each cutterhead may be a particular shape. For example, each cutterhead installed in assemblies 406-412 may be any number of blades and/or knives that form a spiral shape, a helical shape, or a continuous line shape. In some embodiments, the cutterheads described herein include blade or knife configurations. Blades and/or knives may be continuous or segmented. Each cutterhead may include one or multiple segments of blades and/or knives.

In some embodiments, the plurality of cutterheads associated with device 100 may be installed and aligned within the cutterhead assemblies 406-412 to plane (e.g., cut) a number of surfaces of the ice ingot. In some embodiments, the cutterheads may be mounted to a support form of the ice planing device 100. For example, each cutterhead may be mounted to a portion of a respective cutterhead assembly which may be mounted to support platen 403.

By way of a non-limiting example, the cutterhead assembly 410 includes or is removably coupled with a first helical cutterhead (not shown) configured to cut a top surface of an ice ingot. The cutterhead assembly 408 includes or is removably coupled with a second cutterhead 452 configured to plane a first side surface of the ice ingot. The cutterhead assembly 412 (not shown) includes or is removably coupled with a third helical cutterhead (not shown) configured to plane a bottom surface of the ice ingot. The cutterhead assembly 406 includes or is removably coupled with a fourth helical cutterhead 454 configured to plane a second side surface of the ice ingot.

In operation, the cutterheads may be removably installed into a particular cutterhead assembly (e.g., drum) which ensures each cutterhead may rotate to generate a cutting surface with which to cut (e.g., plane) the ice ingot. The cutterheads may be replaced upon damage or wear. Planing of each side of surface of the ice ingot may occur sequentially, simultaneously, or a combination of both.

In some embodiments, the second helical cutterhead 452 and the fourth helical cutterhead 454 may both simultaneously cut (e.g., plane) the ice ingot on the first side surface and the second side surface (the first side surface being opposite the second side surface), respectively, as the ice ingot is moved from infeed assembly 102 through planing assembly 106. For example, once the ice ingot arrives at the first helical cutterhead of assembly 410 and the third helical cutterhead of assembly 412, the top and bottom cuts may be performed simultaneously while the remainder of the length of the ice ingot continues to be fed through the opening and continues to be planed (e.g., cut) on the first side and the second side. Thus, all four sides may be planed simultaneously until the tail end of the ice ingot moves beyond the second helical cutterhead and the fourth helical cutterhead.

In general, the cutterheads 452, 454, etc. may each be installed in a respective assembly 406-412 and may be spinning to engage and plane (e.g., cut) the ice ingot during processing. In some embodiments, the first helical cutterhead associated with assembly 410 is movable while the third helical cutterhead associated with assembly 412 is fixed. In some embodiments, the second helical cutterhead 452 is fixed while the fourth helical cutterhead 454 is movable. For example, the second helical cutterhead 452 and the third helical cutterhead associated with assembly 412 are fixed to a support frame of the ice planing device 100, such as support platen 403. Similarly, the first helical cutterhead associated with assembly 410 and the fourth helical cutterhead 454 are movably located within the ice planing apparatus according to a size of the ice ingot. That is, such cutterheads may move to accommodate several differently sized and/or shaped ice ingots.

In a non-limiting example, a top surface and a second side surface may be planed to a depth from about 0.5 millimeter to about 6.5 millimeters. The bottom surface and the first side surface may be planed to a depth from about 1 millimeter to about 3.2 millimeters. In some embodiments, the cutterheads may plane each surface of the ice ingot from about 3 millimeters to about 6 millimeters. In some embodiments, the cutterheads may be configured via controls 312 or 314, for example to plane one or more surfaces of the ice ingot from about 1 millimeter to about 6 millimeters.

Figure 4B:
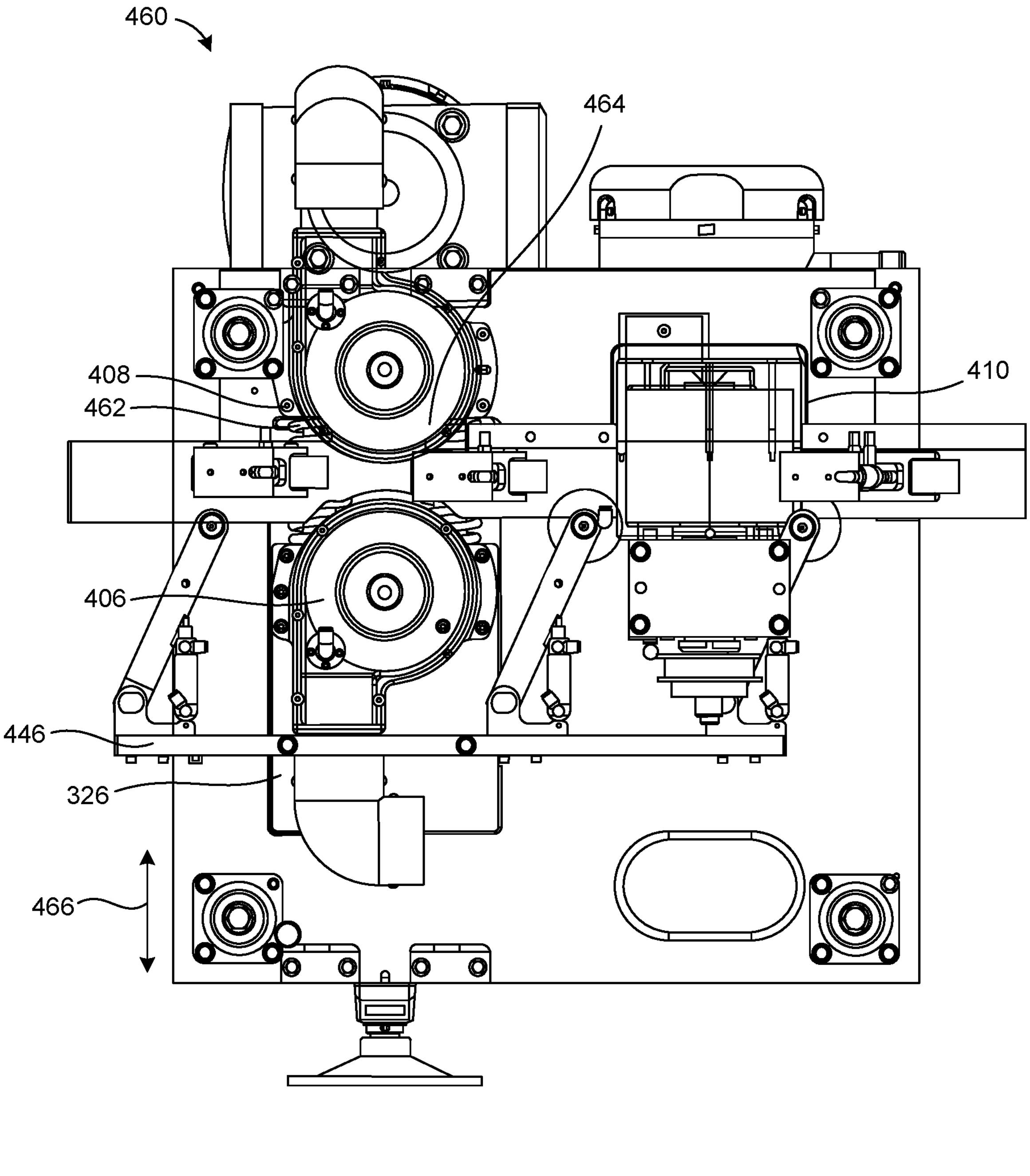
FIG. 4B is a top down view of the example cutting assembly of the planing assembly of FIG. 3.

FIG. 4B is a top-down view 460 of the example cutting assembly 402 of the planing assembly 106 of FIG. 3. In this example, the cutterhead assemblies 406, 408, and 410 are again shown. The cutterhead assemblies 406 and 408 may function as horizontal cutting mechanisms. The horizontal movement may trigger linear carriage 326 to move via the handwheel 314, for example, connected to lead screws preloaded with linear springs 462 and 468 (and associated linear guide rods) in the direction of arrow 466.

Figure 4C:
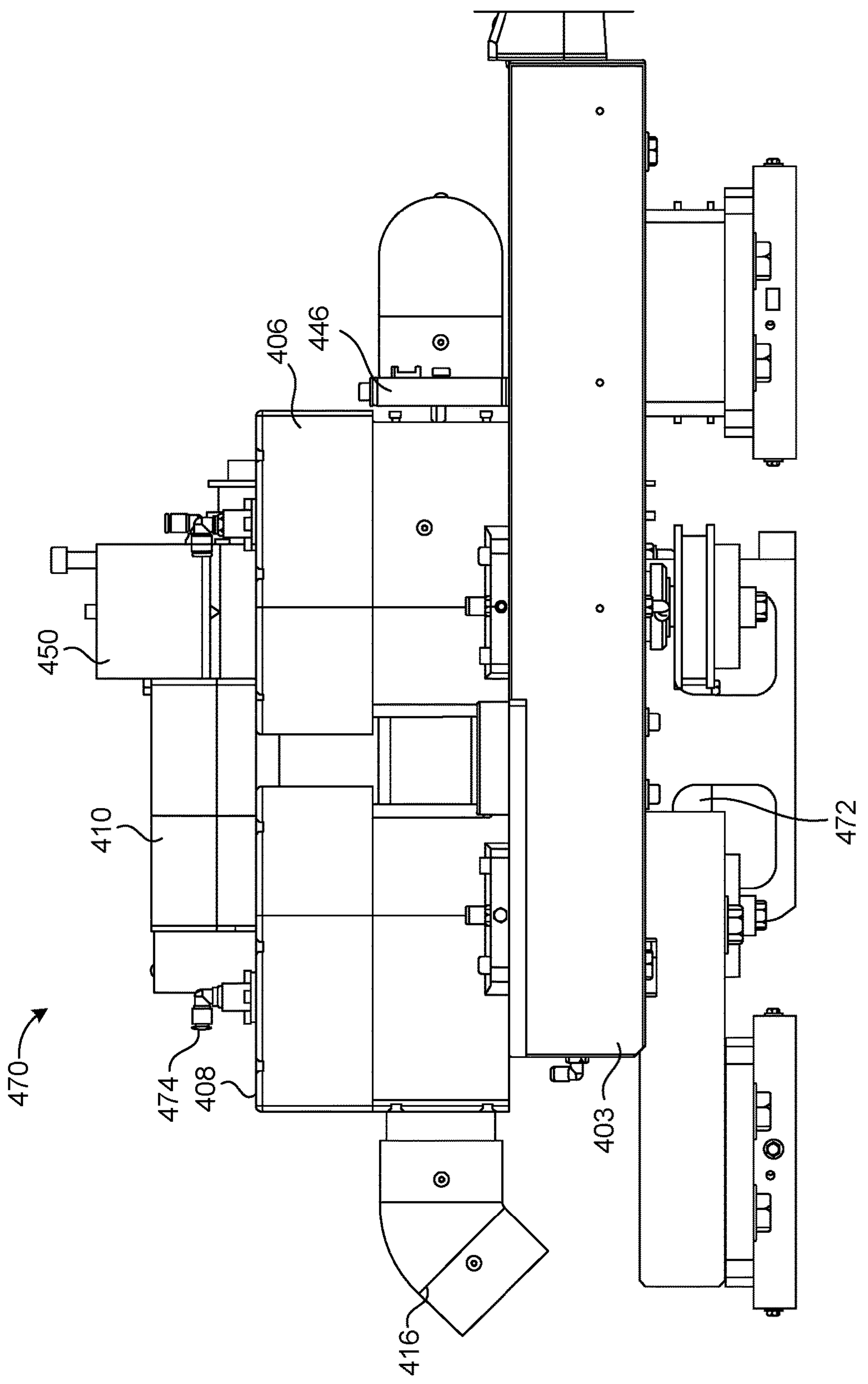
FIG. 4C is a side view of the example cutting assembly of the planing assembly of FIG. 3.

FIG. 4C is a side view 470 of the example cutting assembly 402 of the planing assembly 106 of FIG. 3. In this example, the cutterhead assemblies 406, 408, and 410 are again shown. In addition, a fourth cutterhead assembly 472 is shown below the support platen 403. The fourth cutterhead assembly 472 may be associated with cutterhead 412 (FIG. 4A). In this arrangement, the cutterhead assembly 410 and cutterhead assembly 472 may include respective cutterheads for cutting an ice ingot in a vertical direction. The cutterhead assembly 408 and the cutterhead assembly 406 include respective cutterheads for cutting an ice ingot in a horizontal direction.

In addition, each cutterhead assembly may include one or more ports or connections to connect to internal air nozzles for purposes of blowing air out of evacuation pipes coupled to evacuation shrouds. For example, the cutterhead assembly 408 includes ports (e.g., port 474) that may be connected to a compressed air supply that is controlled by controller 124 and pneumatics control box 132 to blow compressed air through internal air spray nozzles (not shown) to remove cut and/or shaved ice particles away from the ice ingot and into the evacuation pipe 416 and eventually into a container associated with ice collection system 108, for example.

In some embodiments, the planing device 100 includes a delivery means to deliver an ice ingot to the cutting assembly 402. The device 100 may also include an adjuster means (e.g., handwheels 312 and/or 314) for adjusting the cutting assembly 402 to control a depth of planing of the ice ingot placed on surface 404 on a plurality of surfaces of the ingot.

The cutting (e.g., planing) may be performed by a plurality of cutterheads. The cutterheads may include a first cutterhead configured to cut a top surface of the ice ingot, a second cutterhead configured to plane a first side surface of the ice ingot, a third cutterhead configured to plane a bottom surface of the ice ingot, and a fourth cutterhead configured to plane a second side surface of the ice ingot.

Figure 5:
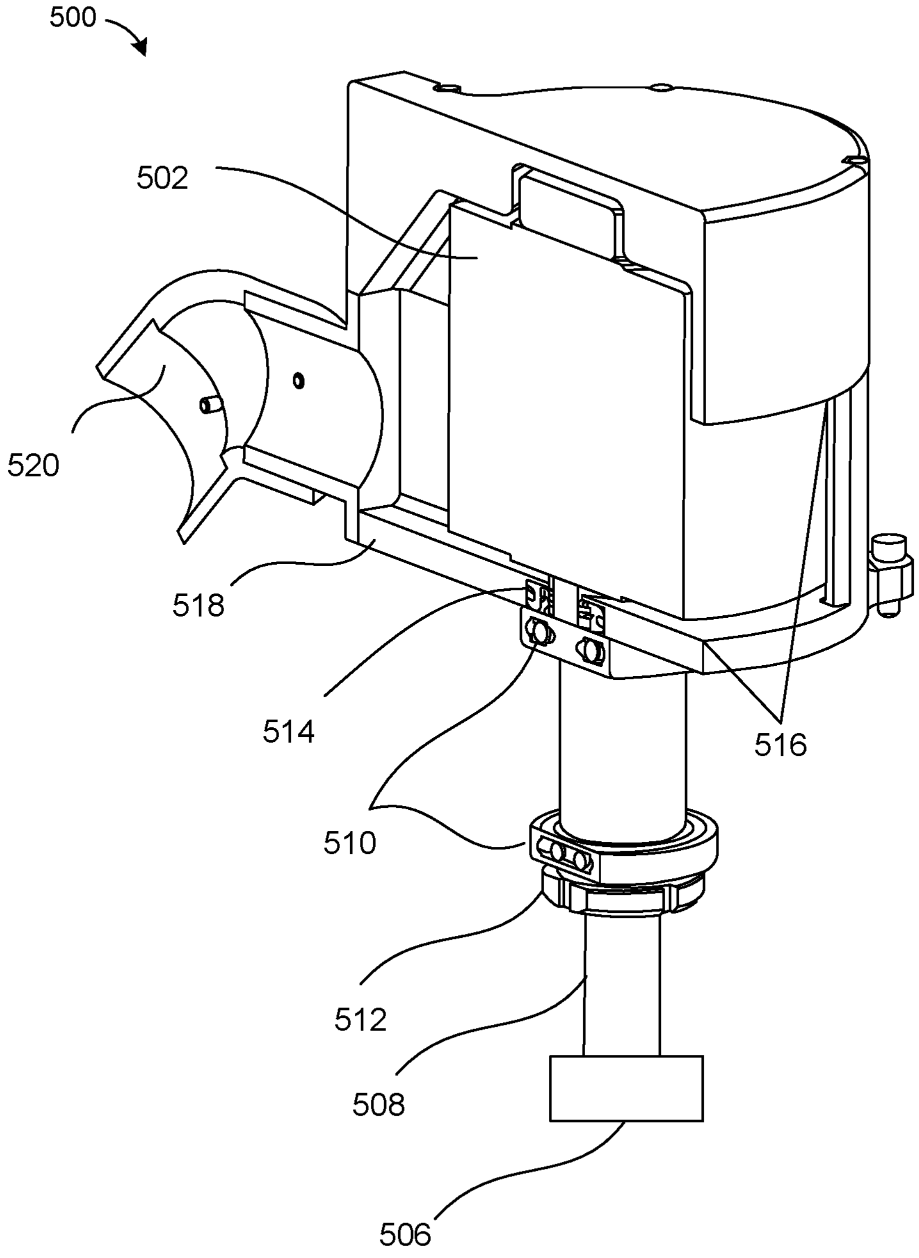
FIG. 5 is an exploded partial view of an example arbor assembly of the planing assembly of FIG. 3.

FIG. 5 is an exploded partial view of an example arbor assembly 500 of the planing assembly 106 of FIG. 3. The arbor assembly 500 represents a mechanism that may hold at least one cutterhead 502 (e.g., blade, knife, etc.) and may function to move the cutterhead toward or away from a workpiece, such as an ingot of ice. In some embodiments, the planing assembly 106 may include at least two arbor assemblies 304. In some embodiments, the planing assembly 106 may include four arbor assemblies 304.

As shown, the arbor assembly 500 includes an arbor 504 supported for rotation by one or more arbor brackets (not shown). The arbor 504 may represent a mechanical interface to receive one or more fixedly installable cutterheads (such as cutterhead 502). The arbor 504 is coupled to a sprocket 506 retained by taper lock bushing (not shown). A spindle 508 may be integrated with the sprocket 506. The spindle 508 may be supported by bearing 510 and secured by a bearing nut 512.

The arbor assembly 500 also includes a spindle shaft 514. The spindle shaft 514 may include an opening 516 (shown here as a partial window in the cutaway arbor assembly 500) in an evacuation shroud 518 which may be sealed by a shaft seal (e.g., a graphite-coated PTFE shaft seal). The shroud 518 may surround a cutterhead (e.g., cutterhead 502). The evacuation shroud 518 may be coupled to evacuation pipe 520 for purposes of evacuating ice chips during processing (e.g., ice ingot planing). The pipe 520 may carry ice chips from the evacuation shroud 518 to the ice chip collection system 108.

In some embodiments, the opening 516 may be a window that is selected to a minimal size such that an ice ingot undergoing processing (e.g., planing) may fit within the window, but ice chips may be deterred from escaping through the opening 516. In general, the window in a particular shroud may be sized to accommodate a predefined maximum size of ice ingots that may be planed in device 100 to maximize the suction pressure and/or velocity of ice chips and/or particles being planed from the ice. The suction pressure and/or velocity may be associated with evacuation pipes and blower vacuum specifications. In general, evacuation shrouds described herein may be configured such that the opening 516 for ice chips and/or particles aligned tangentially to the particular cutterhead of the respective cutterhead assembly, thus, directing the shaved ice chips and/or particles out of the shroud.

In some embodiments, the evacuation shroud 518 includes a series of air nozzles to assist with ice evacuation and to prevent a buildup of ice within the cutterheads. The air nozzles may ensure that ice chips (generated by cutting activities) are directed toward the pipe 520 to be transported to the ice chip collection system 108. In some embodiments, the evacuation shroud 518 may be formed of plastic (e.g., Delrin®, Acetal®, and the like) or other waterproof or water repellant material.

In some embodiments, the cutterhead may be formed of anodized aluminum and may support carbide-based inserts. Other materials used on arbor assembly 500 may include, but are not limited to, stainless steel, graphite, and PTFE, just to name a few examples. In general, the arbor assembly 500 may be designed and manufactured of materials and/or shaped features to withstand water invasion from ice chips, ice ingots, and melted versions of such materials. Further, arbor assembly 500 may be easily removable and/or replaceable so that blades can be replaced, sharpened, or exchanged.

Figure 6:
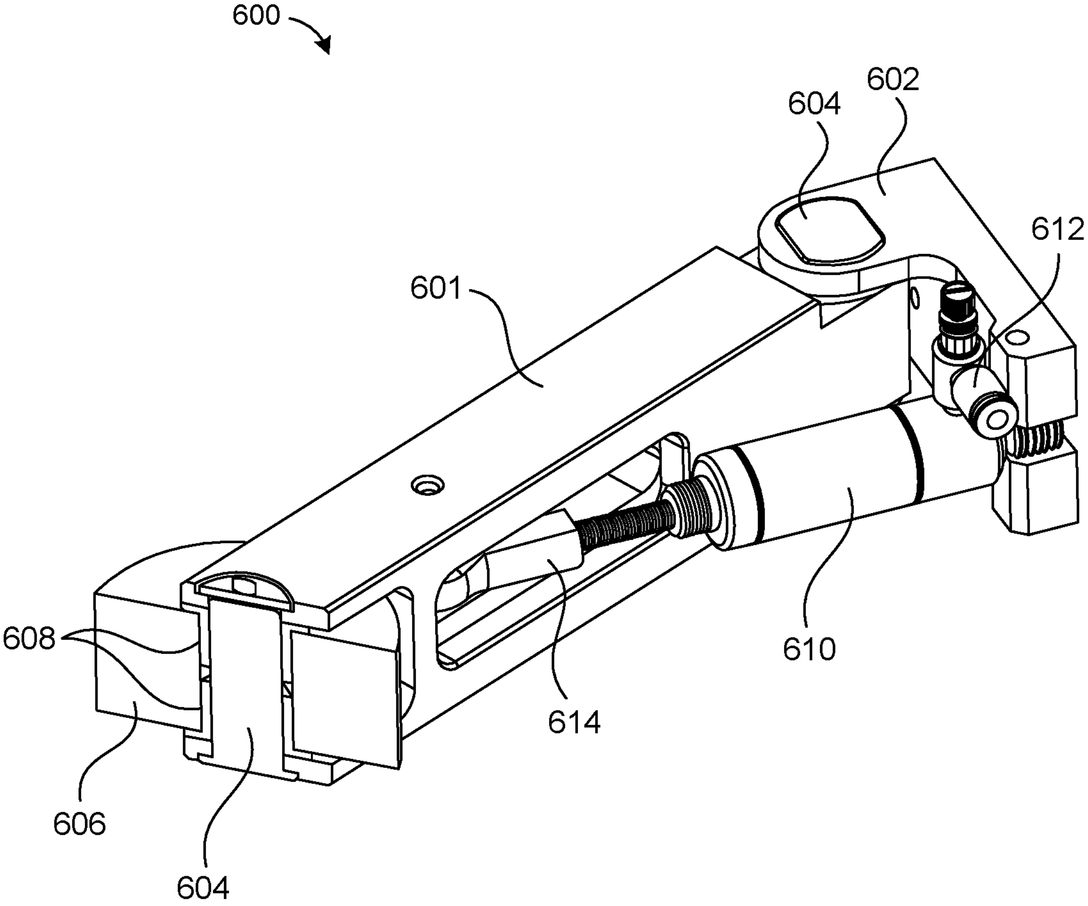
FIG. 6 is an exploded view of an example roller guide assembly of the planing assembly of FIG. 3.

FIG. 6 is an exploded view of an example roller guide assembly 600 (e.g., roller guide assembly 310) of the planing assembly 106 of FIG. 3. The roller guide assembly 600 may be used to hold and/or guide an ice ingot (e.g., a workpiece) into a work area for planing. The roller guide assembly 600 may include a base 602 attached to the planing device 100 at a support structure (not shown) by one or more fasteners (not shown). The planing device 100 may include any number of roller guide assemblies 600 to hold and/or guide an ice ingot during processing.

As shown, a first end of the support arm 601 attaches to the base 602 via a first axle 604. A second end of the support arm 601 attaches to a roller 606 via a second axle 604. This roller 606 may physically connect with the ice ingot to hold and guide the ice ingot through the cutting assembly 402. Flanged bushings 608 support and/or interface with the roller 606 and the axels 604. The air cylinder 610 may be coupled to the support arm 601 using a ball joint rod with bearing 614.

In operation, an operating force may be generated by an air cylinder 610 and applied to the ice ingot via the roller 606. The force provided by the air cylinder 610 can be adjusted via a flow control valve 612. For example, the air cylinder 610 may control a pressure of one or more feed rollers (e.g., roller 606 and the like) against the ice ingot. The pressure may be tuned based on the size of the ice ingot. Tunable pressure of the rollers provides an advantage of ensuring that smaller and/or delicate ice ingots are not damaged during processing. In some embodiments, the flow control valve 612 controls how fast the cylinder actuates. A regulator in the pneumatics enclosure 132 controls the force that the cylinder will apply.

In some embodiments, the base 602 and support arm 601 may be formed of anodized aluminum. The air cylinder 610, the ball joint with rod 614, axle 604, and flow control valve 612 may be formed of stainless steel with a PTFE bearing, for example. The bushings 608 may be formed of chemical resistant materials while roller 606 may be formed of polyurethane or other waterproof, water-resistant, and/or food-grade material.

Figure 7:
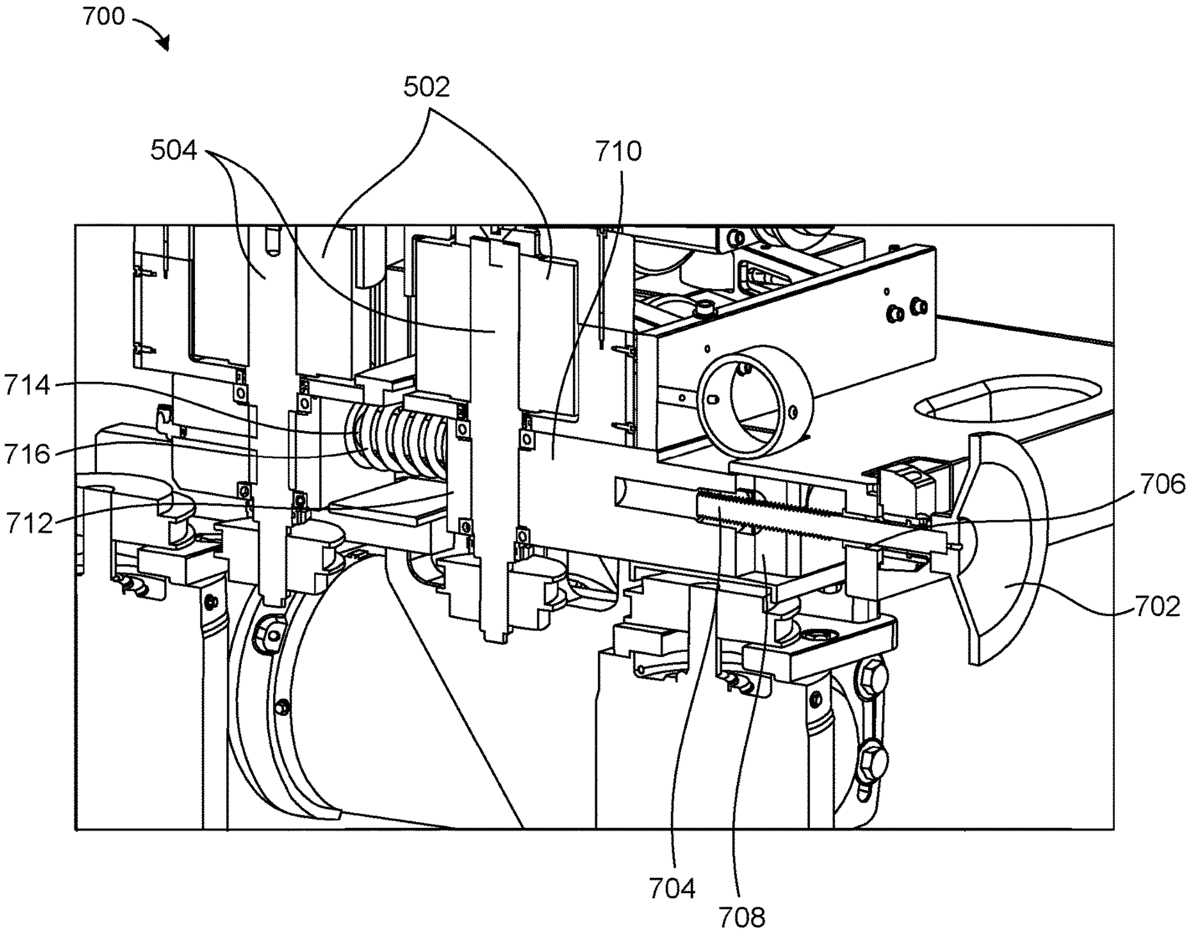
FIG. 7 is an exploded partial view of an example horizontal adjustment assembly of the planing assembly of FIG. 3.

FIG. 7 is an exploded partial view of an example horizontal adjustment assembly 700 of the planing assembly 106 of FIG. 3. The assembly 700 provides a way to adjust a distance between two horizontal cutterheads 502. Adjustments may begin by a user operating a control 702 (e.g., a handwheel control) to trigger movement of at least one of the two horizontal cutterheads 502.

As shown, the horizontal adjustment assembly 700 includes the control 702, a lead screw 704, a thrust bushing 706, an acme nut 708, a linear carriage 710, one or more arbor assemblies 504 with cutterheads 502, linear bearings 712, linear guide rods 714, and preload springs 716. Similar analogous parts may be a part of a vertical adjustment assembly (not shown).

The lead screw 704 is supported by the thrust bushing 706. The lead screw 704 interfaces with an acme nut 708. The acme nut 708 is contained in the linear carriage 710 and linear carriage 710 houses the arbor assemblies 504. The linear carriage 710 also includes linear bearings 712. The linear bearings 712 provide an interface to linear guide rods 714. The interface from the bearings 712 to the guide rods 714 may allow for the linear carriage 710 to traverse laterally back and forth between the cutterheads 502. The preload springs 716 may be used to assert backward (e.g., preload) and consistent pressure on the linear carriage 710 to keep consistent pressure on the moveable (e.g., horizontal) cutterheads in cutting assembly 402, for example.

In operation, the control 702 may be turned to actuate the linear carriage 710, which in turn moves the horizontal cutterhead assembly 502 to modify the depth of a particular horizontally adjusted cut of a particular cutterhead. Although not shown in FIG. 7, a vertical adjustment assembly may be integrated into the planing assembly 106 and may function to control and change a distance between two vertical cutterheads, as described in FIGS. 4A-4C. For example, the handwheel 314 (FIG. 3) may be used to adjust the vertical cuts of the vertical cutterheads.

Figure 8A:
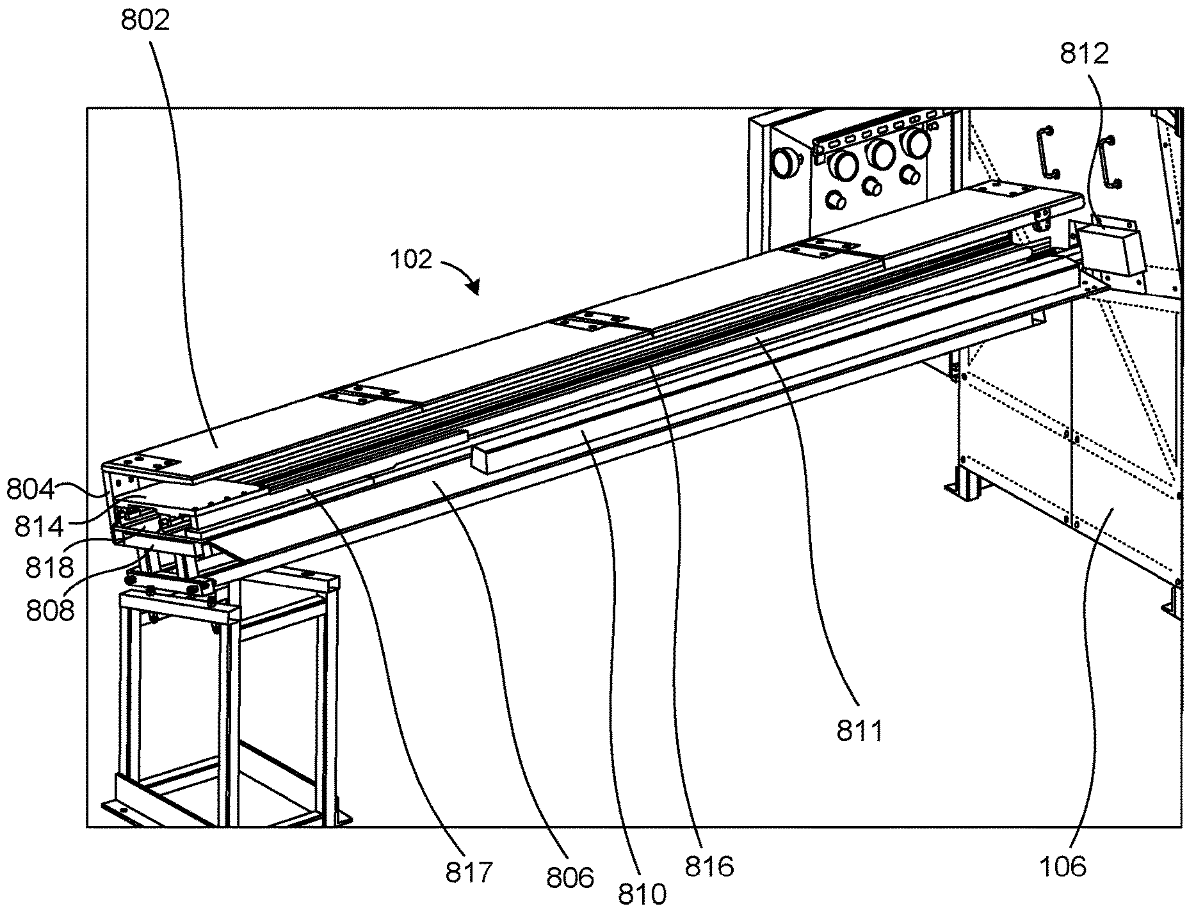
FIG. 8A is a perspective view of an example infeed assembly of the planing device of FIG. 1.

FIG. 8A is a perspective view of an example infeed assembly of the planing device of FIG. 1. For example, the infeed assembly depicted in FIG. 8A may represent the infeed assembly 102 of planing device 100. The infeed assembly 102 may be configured to house one or more ice ingots for processing in planing assembly 106. In some embodiments, the infeed assembly 102 may include an enclosure that protects an ice ingot from mechanical damage and/or temperature damage (e.g., melting). In some embodiments, the ice ingot may be installed in the infeed assembly 102 before the infeed assembly is attached to the planing assembly 106.

As shown, the infeed assembly 102 is supported by a frame portion 801 on a first end portion and a supported by the planing assembly 106 at a second end portion. The infeed assembly 102 includes at least an enclosure that houses one or more components. For example, the infeed assembly 102 may be an enclosure with at least one moveable door for receiving the ice ingot therethrough. For example, as shown, the enclosure includes at least a top portion 802, a side portion, 804 and a door 806. The enclosure may also include a bottom portion 808 that runs the length of the infeed assembly 102.

The door 806 may be hinged to the bottom portion 808 and may span at least a portion of the length of the infeed assembly 102. For example, the door 806 may be movably mounted on the bottom portion 808 at portions along the length of the infeed assembly 102. The hinges of the door 806 may enable a user to open the door, inset an ice ingot, and close the door to enclose the ice in the enclosure by engaging with the top portion 802 along the length of the top portion. In some embodiments, the door 806 may be adapted to support an ice ingot 810 as a user or machine begins to load the ingot 810 into the assembly 102. Although the door 806 is shown as hinged to the bottom portion 808, one of skill in the art will appreciate that the door 806 may be hinged to a top portion 802.

The bottom portion 808 may support a number of structures to support and assist movement of the ice ingot 810 as the ingot 810 is fed into opening 812. For example, a feeder guide 814 may be attached to a backstop 817 (e.g., a hard stop) that may be adapted to connect with and push ingot 810 through opening 812 to be planed by a cutterhead assembly. In operation, the backstop 817 pushes the ingot by exerting a force, shown as arrow F1 in FIG. 8B, on the ice ingot to maintain a position of the ice ingot between the at least one backstop (e.g., backstop 917 of FIG. 9A) and the backstop 817) during pushing of the ice ingot 810 through the opening 812. The guide 814 ensures the backstop 817 moves along rails (e.g., linear rail 816 shown here) that run at least a portion of the infeed assembly 102.

For example, the guide 814 may be configured to guide a first end of the ice ingot and push the ingot using backstop 817 along a planar surface using linear rails 816 installed in the infeed assembly 102. The backstop 817 may push the ingot into the planing assembly 106 (e.g., and eventually into the cutterhead assembly) while the backstop mechanism 917 (FIG. 9A) exerts a force against an opposite and second end of the ice ingot.

A ramp 818 may also be supported on the bottom portion 808. In general, the ramp 818 may be angled to support ice ingot 810 when in place within the enclosure. As shown, the ice ingot, when in place in the infeed mechanism 102, may be seated at an angle to rest against a rounded support 811. In some embodiments, the ramp 818 represents a planar surface that is tilted from a normal axis of a working surface used for operating the ice planing device 100. For example, the ramp 818 may be tilted at about 15 degrees to about 20 degrees, about degrees to about 30 degrees, about 5 degrees to about 45 degrees, etc. downward from a normal axis of the working surface used for operating the ice planing device 100.

In some embodiments, the ramp 818 is tilted at about 8 degrees to about 16 degrees from a normal axis of the working surface used for operating the ice planing device 100. In some embodiments, the infeed assembly 102 and components therein are tilted at about degrees to about 20 degrees downward from a normal axis of the working surface used for operating the ice planing device 100. In some embodiments, the infeed assembly 102 and the components therein are tilted at about 8 degrees to about 16 degrees from a normal axis of the working surface used for operating the ice planing device 100.

The infeed assembly 102 may also be configured with an infeed drive means to guide movement of the ice ingot 810 through a cutterhead assembly of device 100. For example, the infeed drive means may function as a conveyer mechanism to drive the infeed assembly 102 to feed the ice ingot 810 into the planing assembly 106. The infeed drive means may include at least a linkage bar (not shown) and a first set of linear guides (not shown) communicably coupled with a pneumatic assembly (913 of FIG. 9B) and fulcrum system (not shown) to guide and push the ingot 810 for planing and/or other processing. The drive means may include, for example, a servo motor that drives the backstop 817 to push the ice ingot 810 into the planing assembly 106 to be planed.

Figure 8B:
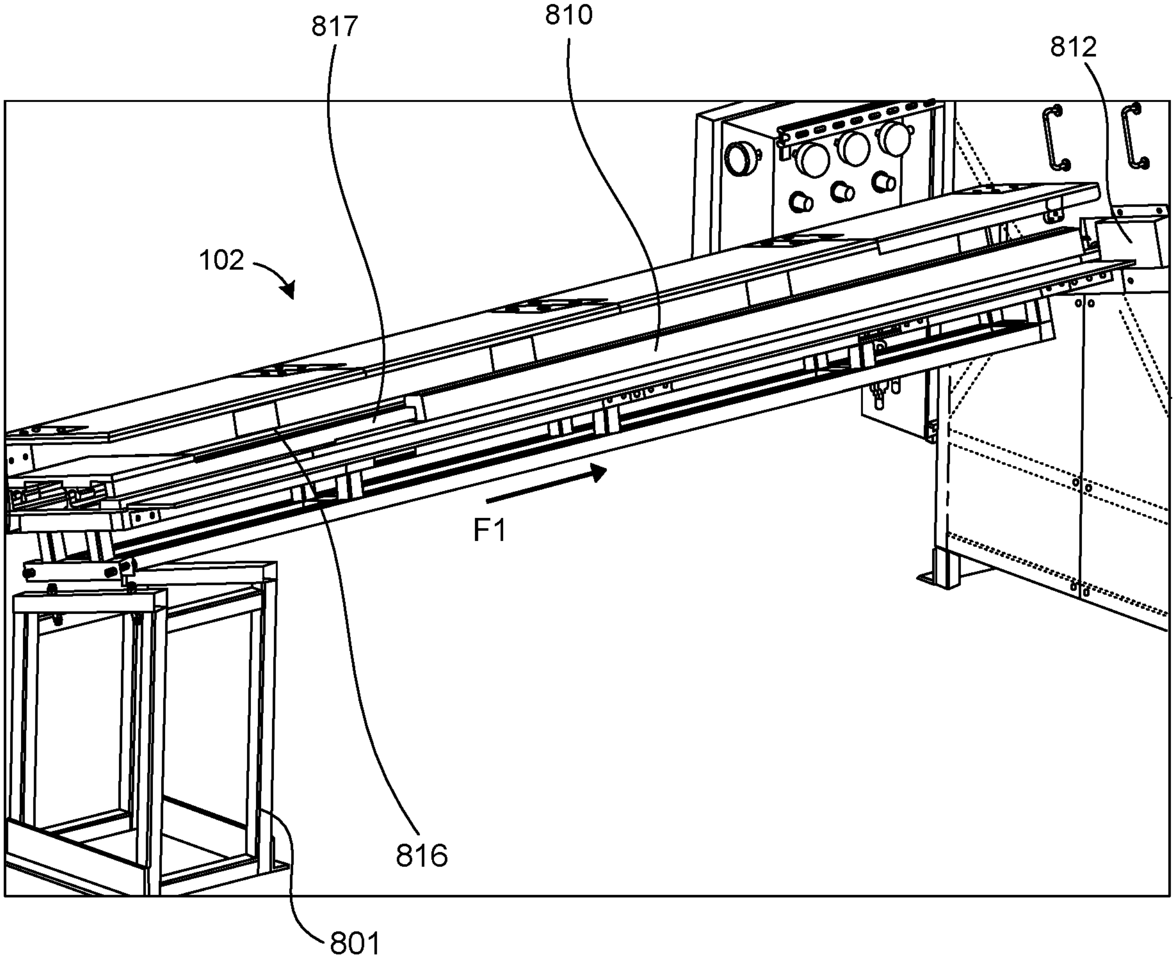
FIG. 8B is a perspective view of the infeed assembly of FIG. 8A with an ice ingot installed therein.
Figure 8C:
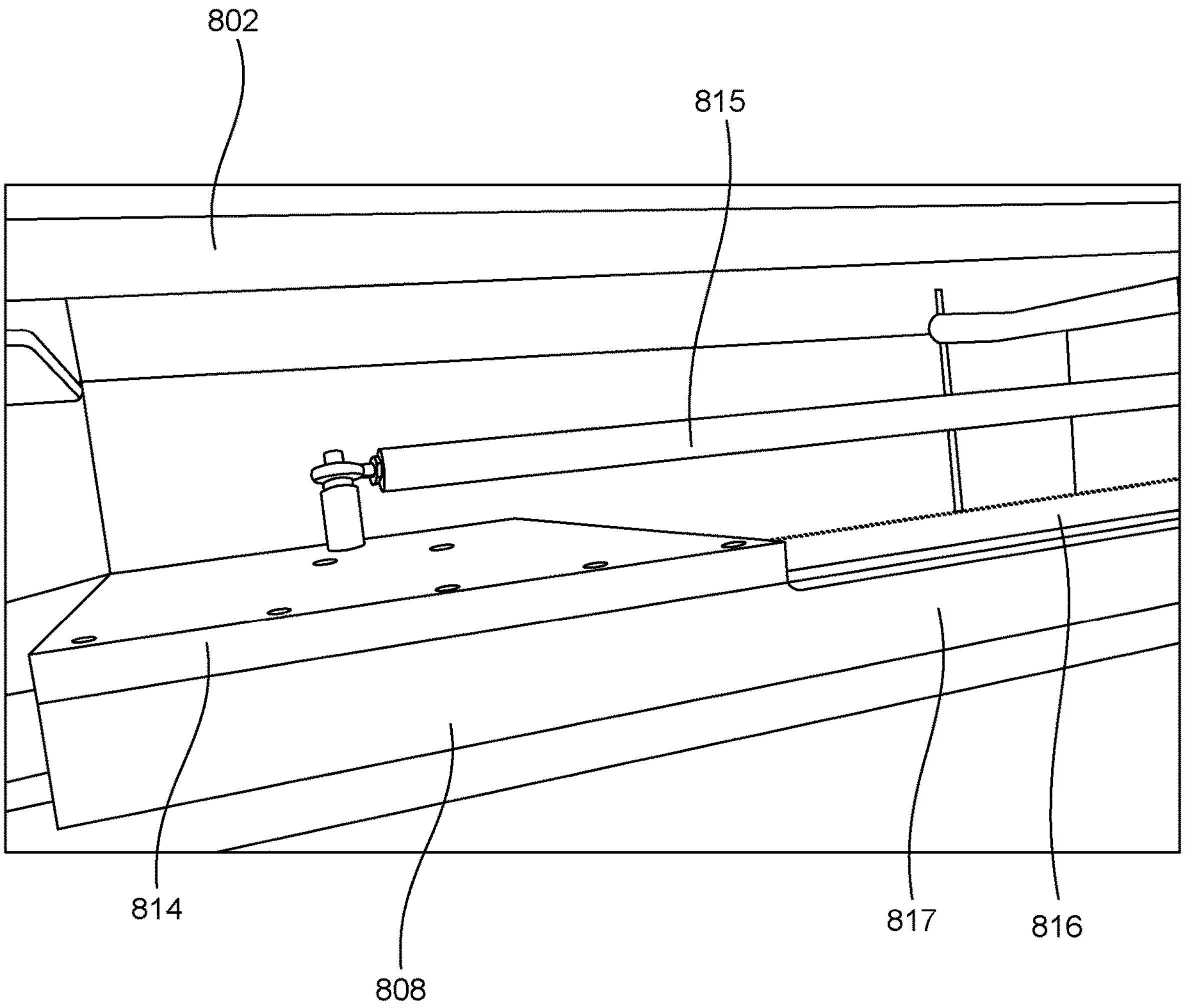
FIG. 8C is a front view of the infeed assembly of FIG. 8A.

In some embodiments, as shown in FIG. 8C, the infeed assembly 102 may also include a linkage bar 815 that couples the infeed guide 814 to the outfeed guide 914. The linkage bar 815 may span the infeed assembly 102 through the planing assembly 106 and through the outfeed assembly 104. In short, the infeed assembly 102 and the outfeed assembly 104 may be connected by the linkage bar 815 that is installed within the infeed assembly 102 through the planing assembly 106 and through the length of the outfeed assembly 104. In some embodiments, the linkage bar 815 connects the driven backstop of the infeed guide 814 of the infeed assembly 102 to the clamping backstop assembly on the outfeed guide 914 of the outfeed assembly 104. The length of the linkage bar 815 may dictate a length of the ingot that the planing device 100 can accept. A maximum linkage length, therefore, may be a function of the length of the infeed assembly 102 and outfeed assembly 104. A minimum linkage length may be a function of the width of the planer assembly 106.

The linkage bar 815 (e.g., also shown as linkage bar 940 of FIG. 9B) may be attached to an infeed guide (not shown) which may be mounted to a first set of linear rails 816 in the infeed assembly 102 and through the planing assembly 106 and to the outfeed portion where the linkage bar is attached to the outfeed guide assembly which is mounted to another set of linear guides (not shown).

The infeed guide 814 may be communicably coupled through the linkage bar 815 with a pneumatic cylinder and fulcrum system on the outfeed guide 914 to clamp the ingot between the infeed backstop 817 and the outfeed backstop 917 and push the ice ingot 810 through the opening of the planing assembly 106 and may continue to guide and push the ingot 810 to the outfeed assembly 104. The outfeed assembly 104 may guide the planed ice ingot 810 out of the planing assembly 106. In some embodiments, the infeed assembly 102 and the outfeed assembly 104 both include linear rails to engage with and move the ice ingot 810 in combination with the backstop 817. In some embodiments, the backstop 817 may be or include a servo bar feeder attached to a linear servo motor to pull the ice ingot 810 on a surface along the linear rails 816, for example, to push the ice ingot 810 through the opening of the planing assembly 106 and to the outfeed assembly 104.

In general, the infeed assembly 102 and associated components may be designed and manufactured of materials and/or shaped features to withstand water invasion and/or water damage from ice chips, ice ingots, and melted versions of such materials. For example, the infeed assembly 102 and/or associated components may be formed of any or any combination of stainless steel, plastics, and/or polymers (e.g., polycarbonate, Delrin®, Acetal®, etc.) anodized aluminum, etc. In some embodiments, the infeed assembly 102 may be modified to be varied in length and size to accommodate ice ingot sizes. For example, the infeed assembly 102 may be about 1 meter to about 2.7 meters in length.

In some embodiments, the distance between the infeed assembly 102 and the outfeed assembly 104 (e.g., a distance between backstop 817, 917) may be adjustable via a pneumatic system. For example, to ensure ease of loading and unloading ice ingots, the assemblies 102, 104 may be extended or shortened. For example, the infeed assembly 102 may be configured and/or modified to receive ice ingots that measure from about 0.6 meters to about 2 meters in length. Similarly, the infeed assembly 102 may be configured and/or modified to receive ice ingots that measure from about 4 centimeters to about 10 centimeters on a side (e.g., width and/or height). In some embodiments, the ingots are cylindrical or semi-cylindrical and may have a radius of about 2 centimeters to about 5 centimeters.

FIG. 8B is a perspective view of the infeed assembly 102 of FIG. 8A with the ice ingot 810 installed therein. Here, the backstop 817 is configured to push ingot 810 into the opening 812 to be planed while the support 811, shown in FIG. 8A, applies pressure to hold and guide the ice ingot 810 during processing. In general, the support 811 may be rounded (e.g., arched, cylindric, curved, etc.) to allow the ice ingot 810 to rest against an elongate length of the assembly 814. The rounded shape of the support 811 may accommodate a number of different angles and/or ice shapes while still functioning to hold the ingot and avoid slippage.

In operation, a resistance is applied, by the outfeed assembly, to the leading end of the ice ingot 810 near opening 812 (e.g., a portion of ice ingot to be cut first in planing assembly 106) to ensure the ice ingot is securely held under compression. In addition, the ice ingot may be held in place laterally by at least two pairs of spring-loaded rollers which may allow for movement and variation in the incoming ice ingot 810. The ice ingot 810 is fed into the cutterhead assembly within the planing assembly 106 to generate a finished ingot that is simultaneously planed on two or more surfaces.

Figure 9A:
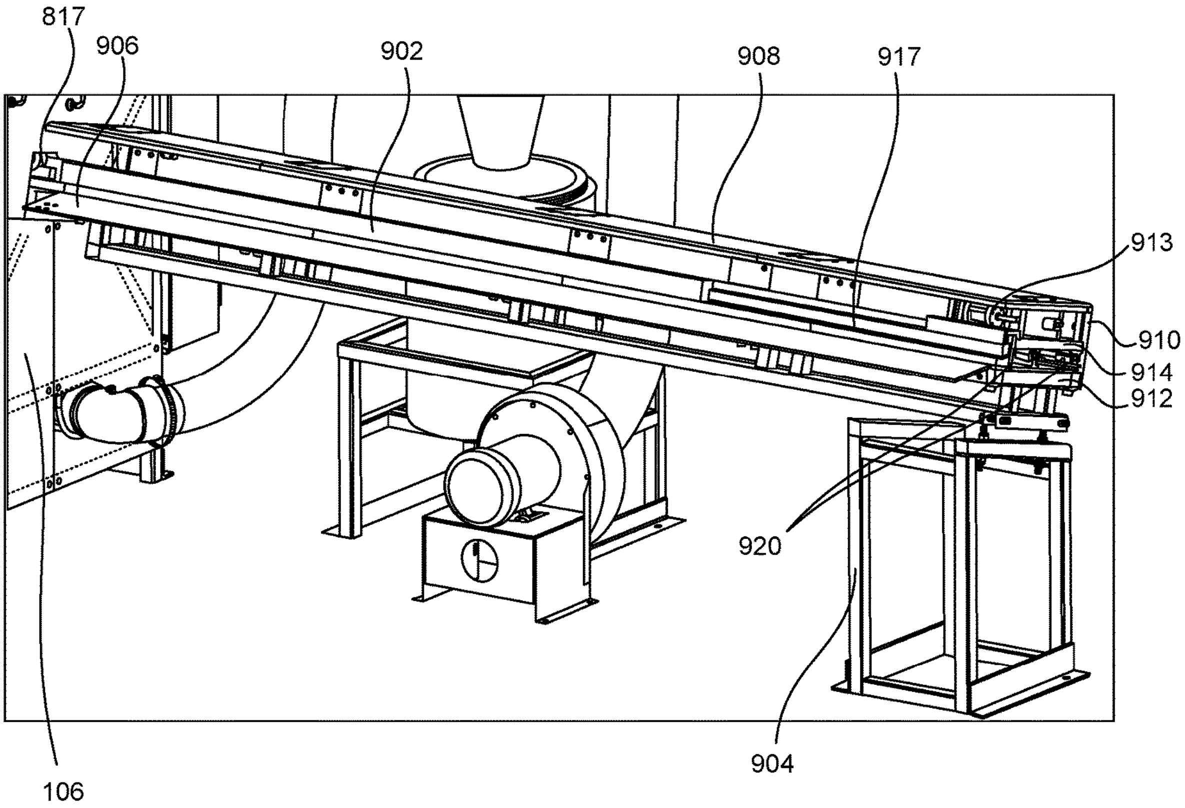
FIG. 9A is a perspective view of an example outfeed assembly of the planing device of FIG. 1.

FIG. 9A is a perspective view of an example outfeed assembly of the planing device of FIG. 1. For example, the outfeed assembly may represent outfeed assembly 104 of planing device 100. The outfeed assembly 104 may be configured to house one or more planed ice ingots 902 after undergoing planing (e.g., or related processing) by the planing assembly 106. In some embodiments, the outfeed assembly 104 may include an enclosure that protects an ice ingot from mechanical damage and/or temperature damage (e.g., melting).

As shown, the outfeed assembly 104 is supported by a frame portion 904 on a first end portion and a supported by the planing assembly 106 at a second end portion. The outfeed assembly 104 may include an enclosure with at least one moveable door 906 for removing the planed ice ingot 902 therethrough. For example, as shown, the enclosure includes at least a top portion 908, a side portion 910, and the door 906. The enclosure may also include a bottom portion 912 that runs the length of the outfeed assembly 104.

The door 906 may be hinged to the bottom portion 912 and may span the length of the outfeed assembly 104. For example, the door 906 may be movably mounted on the bottom portion 912 at portions along the length of the outfeed assembly 104. The hinges of the door 906 may enable a user to open the door to remove an ice ingot. In some embodiments, the door 906 may be adapted to support the ice ingot 902 as a user or machine removes the ingot 902 from the device 100.

The outfeed assembly 104 includes an outfeed drive means to guide movement of the planed version of the ice ingot from the planing assembly 106. The outfeed drive means may function as a mechanism to drive the outfeed assembly 104 to receive and advance the planed ice ingot 902 from the planing assembly 106. In particular, an outfeed guide 914 may be movable along rails 920. The outfeed guide 914 may be connected to backstop 917 to push and hold tension on the ingot 902 as the ingot 902 is moved through the cutting assembly and to outfeed assembly 104.

In general, the outfeed assembly 104 and associated components may be designed and manufactured of materials and/or shaped features to withstand water invasion and/or water damage from ice chips, ice ingots, and melted versions of such materials. For example, the outfeed assembly 104 and/or associated components may be formed of any or any combination of stainless steel, plastics and/or polymers (e.g., polycarbonate, Delrin®, Acetal®, etc.) anodized aluminum, etc.

Figure 9B:
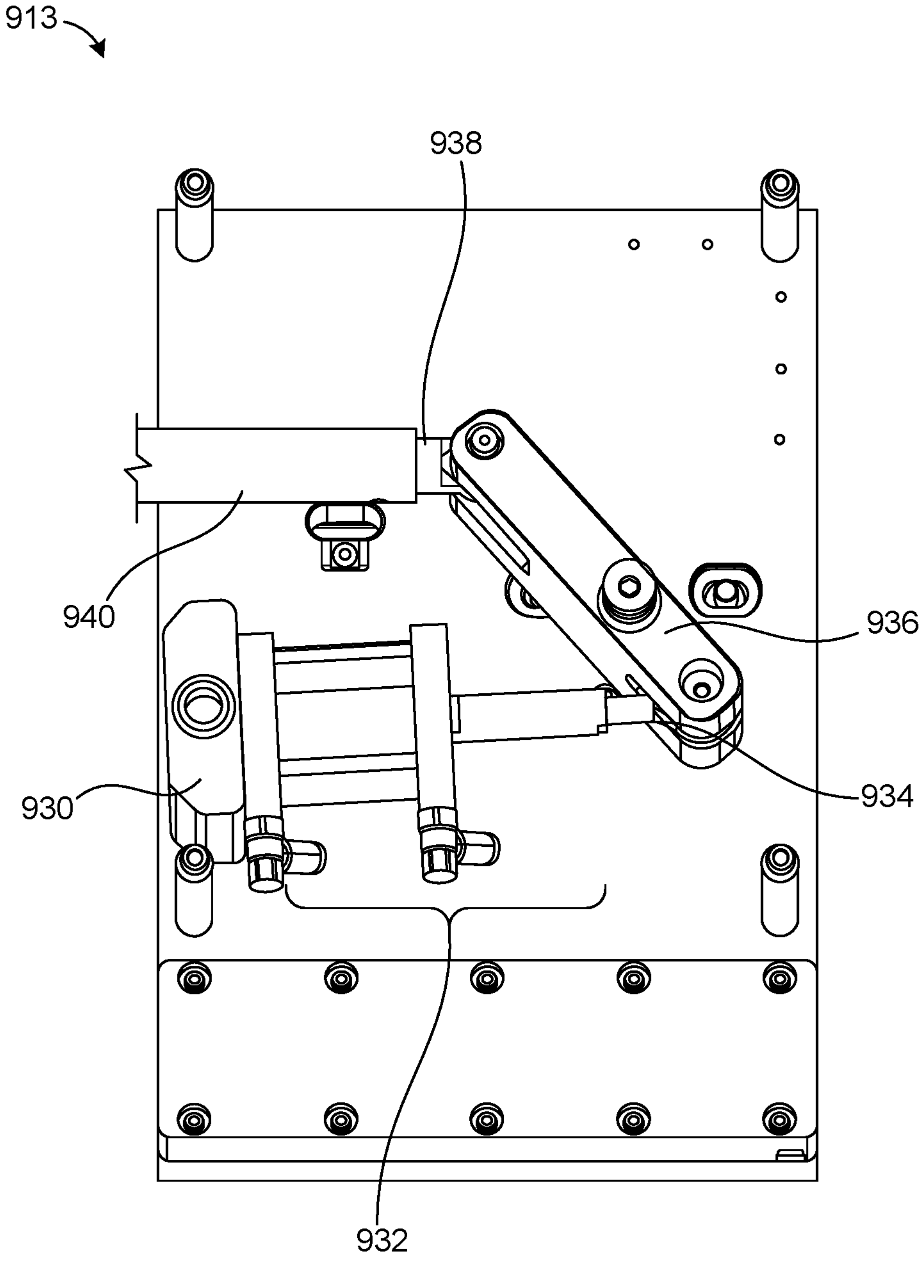
FIG. 9B is an exploded view of the pneumatic assembly of FIG. 9A.

FIG. 9B is an exploded view of the pneumatic assembly 913 of FIG. 9A. The pneumatic assembly 913 may be configured as a drive means to move (e.g., push, pull, lift, etc.) a plurality of guides and/or backstop 917 along the outfeed assembly 104. In some embodiments, the pneumatic assembly 913 may also be configured to provide a drive means for the infeed assembly 102 to move (e.g., push, pull, lift, etc.) a plurality of guides and/or backstop 817 along the infeed assembly 102. The movements of the plurality of guides on the infeed assembly 102 or the outfeed assembly 104 may result in conveying the ice ingot along rails in either or both of the infeed assembly 102 and/or the outfeed assembly 104.

As shown, the pneumatic assembly 913 includes a cylinder mount 930 coupled to a portion of the outfeed assembly 104 on a first end and coupled to a pneumatic air cylinder 932 on a second end. The pneumatic air cylinder 932 may movably receive a 934 ball joint rod (e.g., piston) that is coupled to a tensioning hinge 936 on a first end of the tensioning hinge 936. A second end of the tensioning hinge 936 is coupled to a fitting 938. The fitting 938 is coupled to a linkage bar 940 at a first end. The linkage bar 940 spans at least a portion of the outfeed assembly 104 to couple via a second end of the bar 940 to an end cap adjacent to the planer assembly 106.

In operation, the pneumatic assembly 913 may be attached to a linkage bar running a portion of the length of the device 100 and may function in combination with any number of roller guides to ensure that the ice ingot is compressed and pushed through the planer assembly 106 for planing. In some embodiments, the pneumatic assembly 913 may be communicatively coupled or actually coupled to one or more pneumatic actuators (not shown) that function to shuttle the ice ingot laterally during processing (e.g., planing).

Figure 10A:
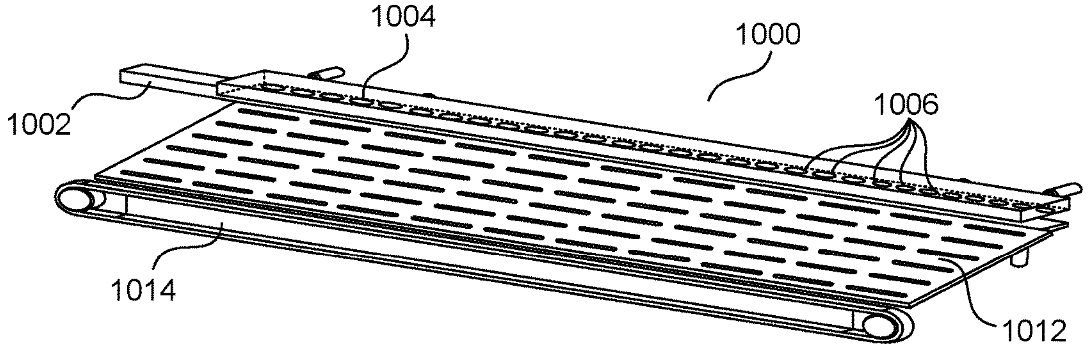
FIG. 10A illustrates a view of an example ingot of ice being positioned on a device for introducing a series of cavities in an ingot of ice.
Figure 10B:
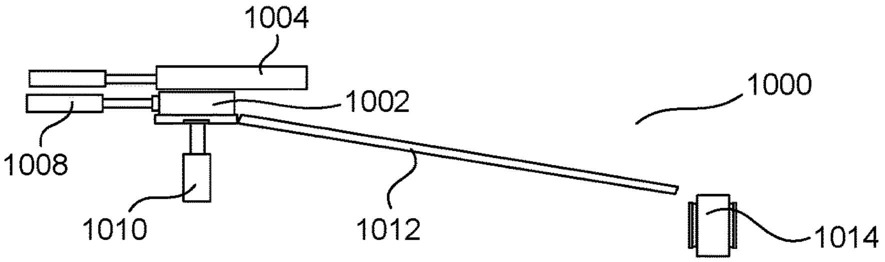
FIG. 10B illustrates a profile view of an example ingot of ice positioned on a device for introducing a series of cavities in an ingot of ice.
Figure 10C:
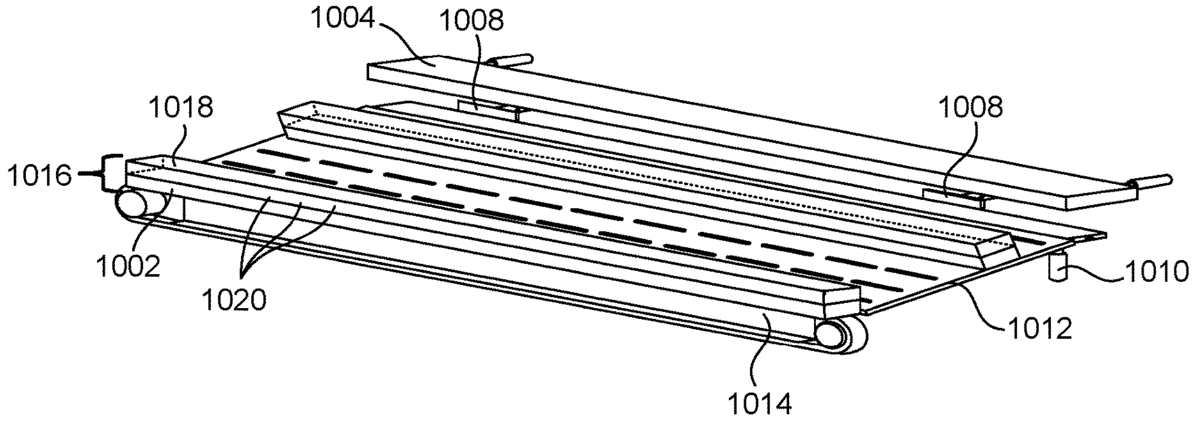
FIG. 10C illustrates a view of an example device for introducing a series of cavities in an ingot of ice having completed a stamping and refreezing operation.

FIGS. 10A-C depicts various views of an example device 1000 for processing an ingot of ice 1002 to have a series of internal cavities. As shown in FIG. 10A, the device 1000 can include a multi-headed heat stamp 1004 that contains a plurality of shaped heating elements 1006. The shaped heating elements 1006 can be adapted such that during a stamping operation of the device 1000, the heating elements 1006 selectively melt cavity having a desired shape into an ingot of ice 1002. The desired shape can be regular or irregular and includes, but is not limited to, a cube shape, a polyhedron shape, a spherical shape, a heart shape, a diamond shape, a clover shape, a polygon shape, etc. In some embodiments, each heating element 1006 of a multiheaded heat stamp 1004 can have the same desired shape, whereas in other embodiments they can have a different desired shape.

Returning to FIG. 10A, an ingot of ice 1002 can be loaded onto the multi-headed heat stamp 1004 so that its length aligns with the arrangement of heating elements 1006. FIG. shows an ingot 1002 not yet fully positioned on the device 1000. An ingot 1002 can be loaded by a variety of means without deviating from the scope of this disclosure. In some embodiments, the ingot 1002 is loaded manually by hand. In other embodiments, an automated conveyor system (not shown) can load an ingot 1002 from a supply of ingots 1002 into the device 1000. FIG. 10B shows a cross-sectional or profile view of the same arrangement demonstrating this alignment.

In some embodiments during a stamping operation of the device 1000, heat from the heating elements 1006 is applied to the ingot 1002 along with gentle pressure to push the heating elements 1006 deeper into the ingot 1002 as the material selectively melts. In some embodiments, actuators (not shown) on the multi-headed heat stamp 1004 provides the pressure. In other embodiments, such as the one of FIG. 10B, a base actuator 1010 lifts the ingot 1002 into contact with the heating elements 1006 and applies the pressure. In some embodiments, the device 1000 further includes a drain system (not shown) to remove the melting liquid from the system.

In some embodiments, the multi-headed heat stamp 1004 additionally includes or is in thermal communication with a cooling system capable of applying a refreezing temperature to the ingot 1002 upon completion of a stamping operation of the device 1000. Once the ingot 1002 has been adequately stamped by the stamping operation, a particular environment may be applied to the stamped ingot 1002. For example, the stamped ingot 1002 may be placed within an environment with a temperature equal to or less than the freezing temperature of the material of the ingot 1002 to prevent any further melting that may deteriorate the desired shape of the ice with respect to the cavity. Furthermore, refreezing the ingot 1002 can serve to dry it, which can also assist in its handling any subsequent processing or packaging operations.

In some embodiments, the ingot 1002 now having a plurality of cavities, can be ejected from the multi-headed heat stamp for further processing or packaging operations. In some embodiments, the ingot 1002 can be removed by hand. In other embodiments, such as the embodiment of FIG. 10C, ejector actuators 1008 push the ingot 1002 out from under the multi-headed heat stamp 1004 onto a loading incline 1012 that delivers it to a conveyor 1014 that can then transport the ingot 1002 to subsequent processing or packaging operations, although other automatic mechanisms can be employed in alternate embodiments. In some embodiments, the subsequent processing operations can include filling the cavities with a flavored and/or colored liquid before an additional refreezing and cutting the ingot 1002 in to separate blocks such that each block contains at least a portion of a cavity, filled or otherwise, produced by the multi-headed heat stamp.

In alternate embodiments, such as the embodiment of FIG. 10C, a hollow ingot of ice 1016 can be formed on the device 1000. In these embodiments, after a stamping operation of the device 1000, a second ingot of ice 1018 can be stacked on top of the first ingot of ice 1002 that contains the cavities 1020. In some embodiments, the second ingot 1018 can have the same dimensions as the dimensions of the first ingot 1002. In other embodiments, the second ingot 1018 can have different dimensions than the first ingot 1002. In some embodiments, the second ingot 1018 can include various features, such as cavities of its own (not shown). In some embodiments, the second ingot 1018 is stacked manually by hand, although in other embodiments, the second ingot 1018 can be loaded automatically onto the first ingot 1002 by a conveyor system or other mechanism. Although the term "stacked" is used herein to describe the positions of the first 1002 and second 1018 ingots, one of skill in the art will appreciate that any arrangement of the first 1002 and second 1018 ingots is functional as long as the cavities 1020 are at least partially sealed by their masses of ice. In the embodiment of FIG. 10C, the cavities 1020 are fully sealed by the second ingot 1018.

The stacked ingots 1002 and 1018 can then be subjected to a freezing operation of the device 1000 such as with the cooling system of the multi-headed heat stamp (not shown) or of another alternate device (not shown) that freezes the first 1002 and second 1018 ingots together into a hollow ingot 1016 that features sealed hollow cavities 1020 within its mass. The hollow ingot 1016 can then be ejected from the device 1000, such as by the ejectors 1008 of the device 1000 of FIG. 10C and transported to subsequent processing and packaging operations. In some embodiments, the subsequent processing operations can include cutting the ingot 1002 in to separate blocks such that each block contains at least a portion of a cavity 1020.

Figure 11A:
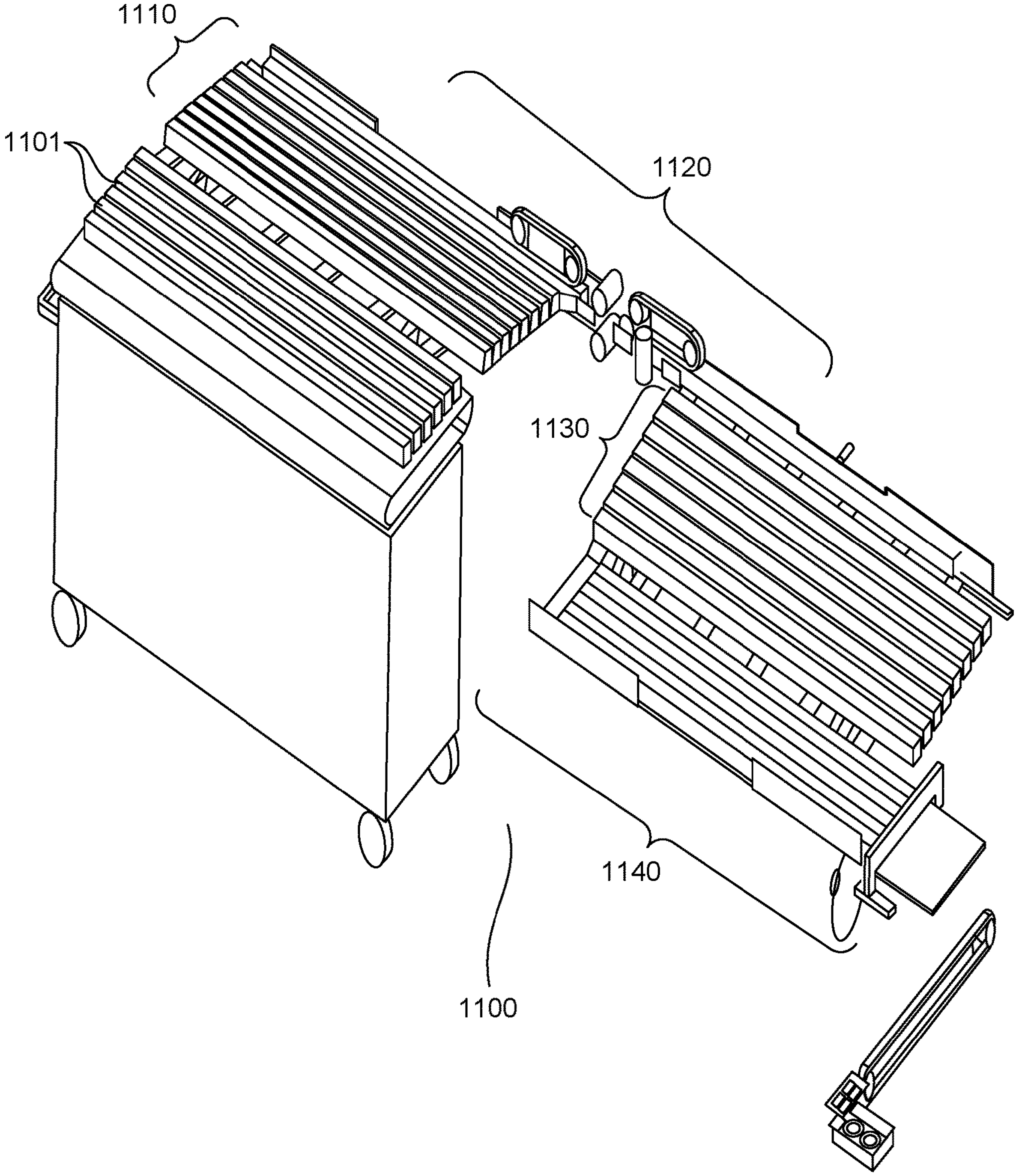
FIG. 11A illustrates a view of an example device for cutting an ingot of ice.
Figure 11B:
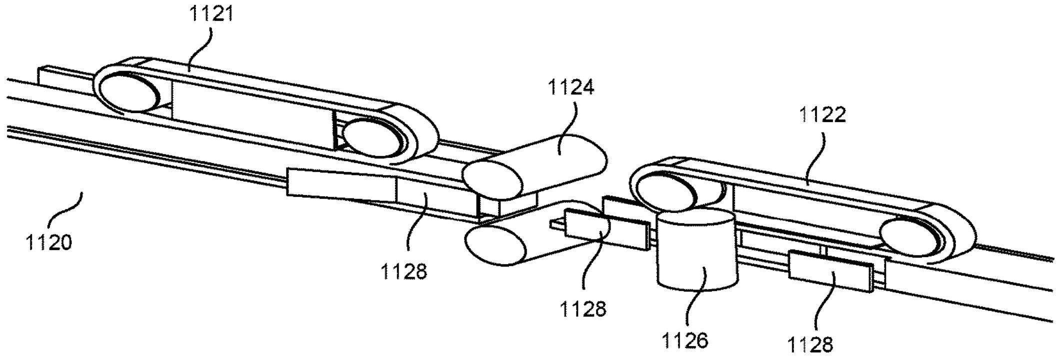
FIG. 11B illustrates a detailed view of an example surface planing system of a device for cutting an ingot of ice.
Figure 11C:
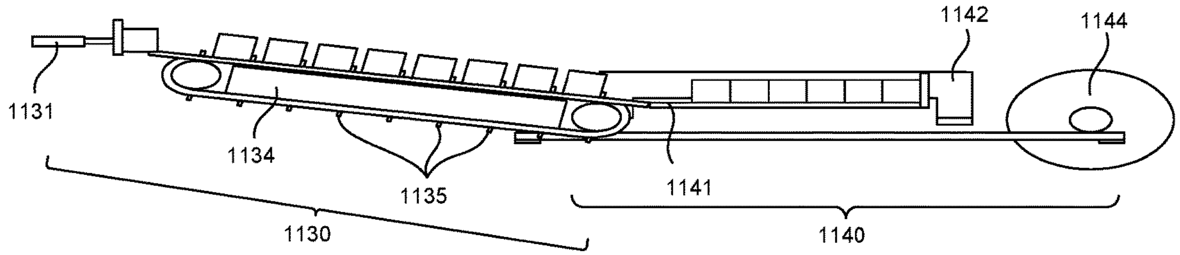
FIG. 11C illustrates a first detailed view of an example crosscutting system and a second loading system of a device for cutting an ingot of ice.

FIGS. 11A-D depict various views of an example device 1100 for cutting an ingot of ice. FIG. 11A depicts an example planer (e.g., a surface planing system 1120) and an example crosscutting system 1140 to generate finished cubes from an ingot of clear ice 1101. As shown, the device 1100 generally includes a first loading system 1110, a surface planing system 1120, a second loading system 1130, and a crosscutting system 1140. The first loading system 1110 delivers ingots of clear ice 1101 into the surface planing system 1120. In some embodiments, the ingots of ice 1101 are manually loaded into the surface planing system 1120 by a user. In other embodiments, the ingots 1101 are loaded via an automated system, such as a segmented conveyor 1134 as shown in FIG. 11C for the second loading system 1130. In some embodiments, a cart 1102 and be used to transport the ingots 1101 to the first loading system 1110.

The surface planing system 1120, shown in more detail in FIG. 11B, planes one or more of the surfaces of the ingots 1101 to predetermined settings. The surface planing system 1120 includes a first and second ingot conveyors 1121 and 1122 that may transport the ice ingots 1101 from the first loading system 1110 across at least one adjustable vertical height planar cutter 1124 and at least one adjustable horizontal height planar cutter 1126 into the second loading system 1130. The heights of the planar cutters 1124 and 1126 can be adjusted by repositioning them with repositioning mechanisms (not shown), and at least one adjustable guide 1128 can help limit the range of motion of the ingots 1101 as they pass between the two planar cutters 1124 and 1126 to help enable a smooth passthrough. In some embodiments, the adjustable planar cutters 1124 and 1126 and the at least one adjustable guide 1128 additionally include reversible locking mechanisms (not shown), allowing them to be rigidly locked in place at desired settings during a cutting operation of the device 1100. The locking mechanisms can be unlocked in order to reposition the adjustable planar cutters 1124 and 1126 and the at least one adjustable guide.

In some embodiments, the adjustable planar cutters 1124 and 1126 and the at least one adjustable guide 1128 are adjusted manually by hand. In other embodiments, the adjustable planar cutters 1124 and 1126 and the at least one adjustable guide 1128 are adjusted automatically by a control system configurable by a user, for example.

FIG. 11C shows a profile view of the second loading system 1130 loading ingots 1101 into the crosscutting system 1140. In some embodiments, the second loading system can include an actuator 1131 that pushes an ingot of ice received from the surface planing system 1120 onto a segmented conveyor 1134. The segmented conveyor 1134 can include a plurality of flanges 1135 that catch an ingot 1101 pushed by the actuator 1131. In some embodiments, the speed of the segmented conveyor 1134 and the ingot 1101 delivery rate from the actuator 1131 can be such that one ingot 1101 resides within each segment as defined by the spacing of the flanges 1135 as shown in the embodiment of FIG. 11C. In some embodiments, the segmented conveyor 1134 is additionally downward sloped in a direction perpendicular to the length of the ingots 1101 as depicted in the embodiment of FIG. 11C. In some embodiments, this downward slope can allow the force of gravity to assist in the compact formation of ingots 1101 in the cutting tray 1141 of the crosscutting system 1140.

The crosscutting system 1140 aligns one or more ingots 1101 that have had their transverse surfaces planed and crosscuts the ingots 1101 into a size compatible for use as a comestible (i.e., in a cocktail). In some embodiments, the crosscutting system 1140 includes a cutting tray 1141 that receives ingots 1101 from the secondary loading system 1130. In various embodiments, the cutting tray 1141 can be adapted to hold one or more ingots 1101. In some embodiments, the cutting tray 1141 holds a plurality of ingots 1101.

Figure 11D:
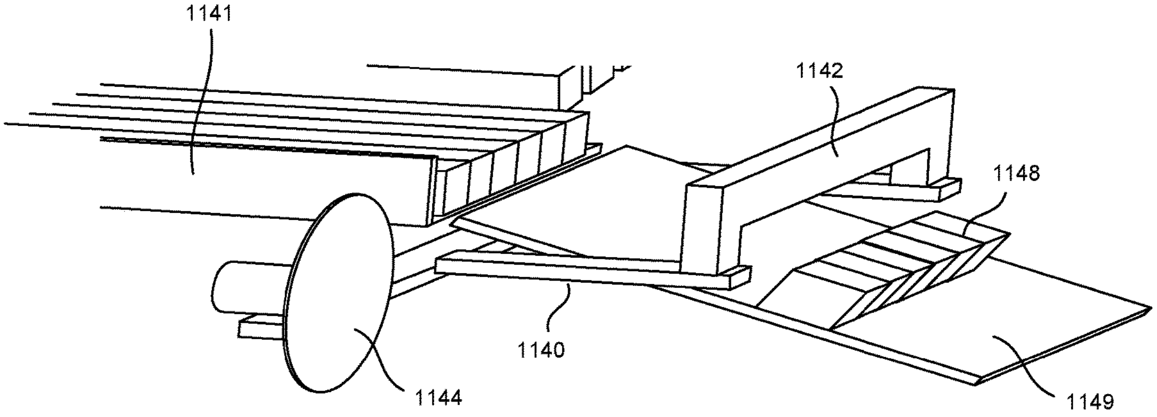
FIG. 11D illustrates a second detailed view of an example crosscutting system of a device for cutting an ingot of ice.

The one or more ingots 1101 in the cutting tray 1141 are then maneuvered until a front end of the one or more ingots 1101 abut against an adjustable hard stop 1142 (as seen in FIG. 11D). The adjustable hard stop 1142 defines length of the one or more ingots 1101 to be cut by a saw 1144 in a crosscutting motion to produce one or more blocks of ice 1148. In some embodiments, the one or more ingots 1101 are maneuvered to the hard stop 1142 by force of gravity by tipping a level cutting tray 1141 with an actuator (not shown), or by having the cutting tray 1141 arranged to have such a slope. In other embodiments, the cutting tray includes a conveyor adapted to position the front end of the one or more ingots against the hard stop 1142.

Across many embodiments, various saws 1144 (e.g., cutterheads) can be used including but not limited to a circular saw or a band saw. In some embodiments, the saw 1144 performs a cutting motion in order to crosscut the one or more ingots of ice 1101. In some embodiments, the saw 1144 can be adapted to move on a secondary axis in order to avoid contact with the ingots 1101 during a retraction motion. In other embodiments, the cutting tray is adapted to move in a manner that applies the saw 1144 to the ingots 1101 in a crosscutting fashion. After the crosscutting motion, the resulting blocks of ice 1148 can then be conveyed or maneuvered into further processing or packaging steps. In some embodiments, the blocks of ice 1148 land on a clearing slope 1149 that instantly delivers them by force of gravity away from the crosscutting system 1140.

The reliability of the ice processing and/or manufacturing devices described herein may be accomplished based on precise positioning of the ingots of ice onto the various devices. In some embodiments, this positioning is done by measured and/or detected alignment of the dimensions of the ingot of ice with the dimensions of the various devices. In some embodiments, any of the devices described herein can include an optical system capable of detecting a proper verses improper position of an ingot before performing an operation.

In some embodiments, any of the above devices can feature actuators and/or conveyors to adjust the position of the ingot. In some embodiments, the ingot of ice can be produced that includes a physical feature that is adapted to assist in the above devices' recognition of ice ingot positioning. Examples of such features include but are not limited to a bump, notch or hole in the ice, a non-ice structure partially embedded in the ingot's surface, or a specific inclusion. In other embodiments, another device or a human actor can reliably tag the exterior of a produced ingot of ice with such a mark.

Figure 12:
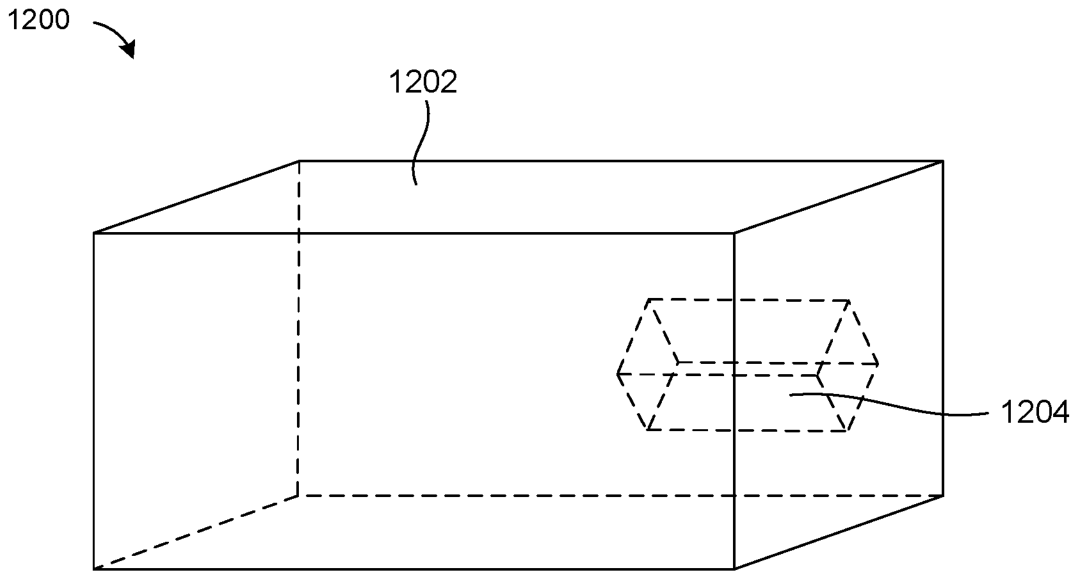
FIG. 12 illustrates an embodiment of an example augmented clear ice product.

FIG. 12 depicts an embodiment of an example augmented clear ice product 1200 that can be produced by various combinations of the devices described herein. The ice product 1200 includes a clear ice portion 1202 having a shape (e.g., a cube), and a refrozen cavity 1204 having a desired shape and filled with at least one of a flavored or colored substance that. Such an augmented clear ice product can be produced by selectively melting a cavity having a desired shape into a block or ingot of ice, filling the cavity with a flavored and/or colored substance, and refreezing the block. In this manner the refrozen cavity 1204 provides an additional aesthetic property to the ice block 1200 in some embodiments. Furthermore, since clear ice melts more slowly than regular ice, the refrozen cavity 1204, which includes faster melting regular ice in some embodiments, melts first when placed in a warmer environment, such as into a drink or cocktail. Due to this feature, the contents of the refrozen cavity 1204, can progressively recolor and/or re-flavor a drink without substantial dilution of the drink by the water ice of the clear ice portion 1202 of the augmented clear ice product 1200.

In some embodiments, the refrozen cavity 1204 is small compared to the total volume of the block of ice 1200. In some embodiments, the refrozen cavity 1204 formed can have a volume of about 25 percent or less of the total volume of block of ice 1200. In other embodiments, the refrozen cavity 1204 can have a volume of about 15 percent or less of the total volume of the block of ice 1200. In still other embodiments, the refrozen cavity 1204 can have a volume of about 5 percent or less of the total volume of the block of ice 1200. In further embodiments, the refrozen cavity 1204 can have a volume of about 2 percent to about 15 percent of the total volume of the block of ice 1200. In still further embodiments, the refrozen cavity 1204 can have a volume of about 2 percent to about 10 percent of the total volume of the block of ice 1200.

Though depicted as a cube in the embodiment of FIG. 12, the augmented clear ice product can take on any shape regular or irregular, appreciable by those of skill in the art, including but not limited to polyhedron, a sphere, a heart shape, a diamond shape, a clover shape, etc. Furthermore, although depicted as a diamond in the embodiment of FIG. 12, the refrozen cavity 1204 can take on any shape. In some embodiments, the cavity has a shape such that is has a cross-sectional shape that is easily recognizable (e.g., a diamond, a heart, a clover, a dime, etc.) In some embodiments, the refrozen cavity 1204 can take the shape of legible text or letters when viewed from a certain perspective. One of skill in the art will also appreciate the various colorings and/or flavorings available, including but not limited to, edible dyes, fruit juices, coffee, tea, soft drinks, and various natural and artificial flavors.

Methods

Figure 13:
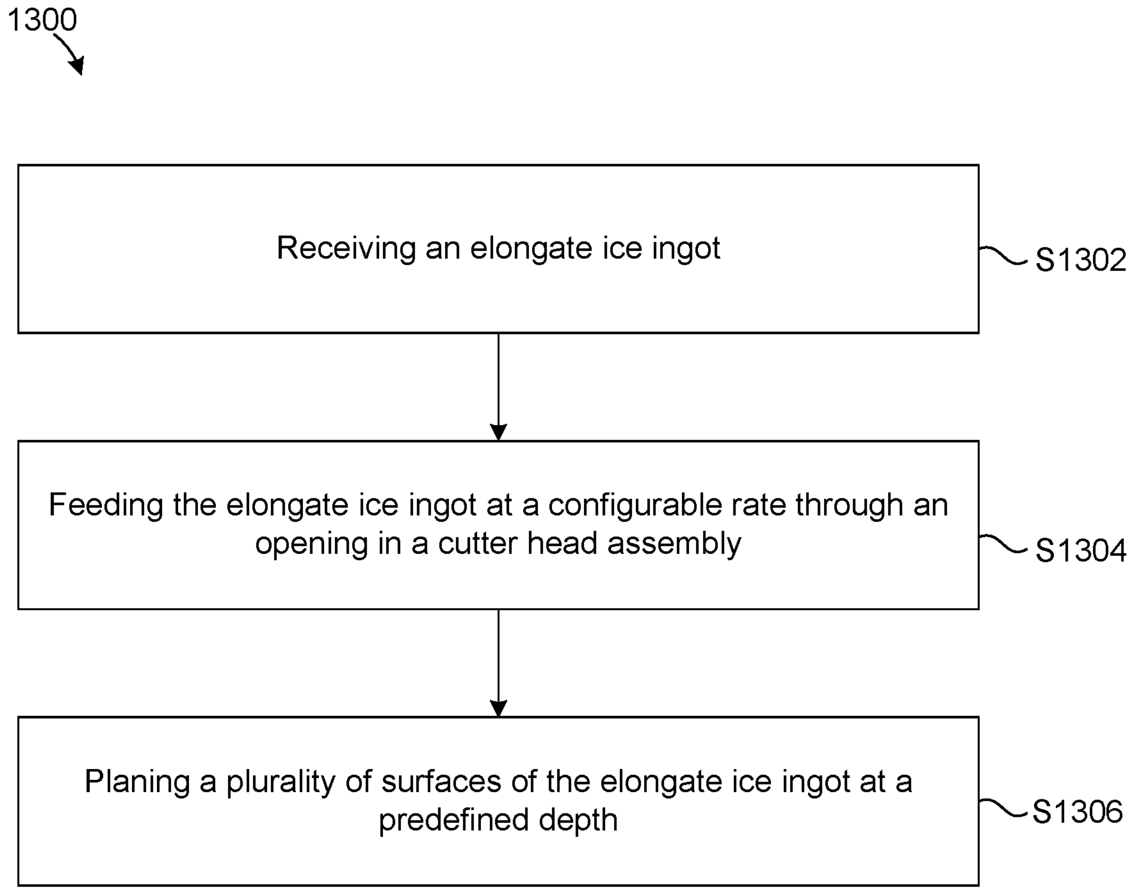
FIG. 13 is a flow diagram of an example process to plane an ingot of ice.

FIG. 13 is a flow diagram of an example process to plane an ingot of ice. The process 1300, in one embodiment, includes receiving an elongate ice ingot in block S1302, feeding the elongate ice ingot at a configurable rate through an opening in a cutterhead assembly in block S1304, and planing a plurality of surfaces of the elongate ice ingot at a predefined depth in block S1306.

In Step S1302, the process 1300 includes receiving, at a planing apparatus, an elongate ice ingot. For example, the device 100 may automatically or manually receive an elongate ice ingot 101 at infeed assembly 102. The ice ingot 101 may be clear, but raw with misshapen surfaces, dents, etc. The planing device 100 may plane one or more surfaces of the ice ingot 101 to obtain a substantially orthogonal rectangle of ice.

In Step S1304, the process 1300 includes feeding the elongate ice ingot at a configurable rate through an opening in a cutterhead assembly of the planing apparatus. For example, the infeed assembly 102 may include one or more structures, such as the backstop 817, tensioner device, and/or a backstop 917 to move the ice ingot 101 through the planing assembly 106. The ice ingot 101 may be advanced through the cutterheads of cutting assembly 402 at a rate configurated at control 124 according to configured horizontal depth settings configured using a control (e.g., handwheel 312). In some embodiments, the cutterhead assembly includes a number of cutterheads that may operate at a configurable rotational speed.

In Step S1306, the process 1300 includes planing, by the cutterhead assembly, a plurality of surfaces of the elongate ice ingot at a predefined depth as the elongate ice ingot is fed linearly through the opening of the cutterhead assembly. For example, the planing assembly 106 may receive the ice ingot 101 and trigger the cutterheads of cutting assembly 402 to perform cutting on each of four surfaces of the ice ingot 101. In some embodiments, the planing assembly 106 may configure the cutterheads of the cutting assembly 402 to plane one, two, or three surfaces of the ice ingot 101, rather than all four surfaces. In some embodiments, the planing assembly 106 may be configured via controls 702 and/or (handwheel 312) to move the cutting assembly 402 components based on whether it is desired to plane one or more of the surfaces of the ice ingot 101.

In general, the planing the plurality of surfaces (or of one or more surfaces) of the elongate ice ingot 101 includes cutting, with the cutterheads of the cutting assembly 402, each of the plurality of selected surfaces to an adjustable depth. The adjustable depth may be configured using the horizontal adjustment assembly via control 702 and/or vertical adjustment assembly via a control (e.g., handwheel 314). In some embodiments, the predefined depth planed from one or more of the plurality of surfaces of the elongate ice ingot 101 is about 3 millimeters to about 6 millimeters. In some embodiments, the predefined depth planed from one or more of the plurality of surfaces of the elongate ice ingot 101 is about 0.5 millimeters to about 3.5 millimeters. In some embodiments, the predefined depth planed from one or more of the plurality of surfaces of the elongate ice ingot 101 is about 0.5 millimeters to about 6 millimeters. In some embodiments, the predefined depth planed from one or more of the plurality of surfaces of the elongate ice ingot 101 is about 2 millimeters to about 3.5 millimeters. In some embodiments, the predefined depth planed from one or more of the plurality of surfaces of the elongate ice ingot 101 is about 3 millimeters to about 5 millimeters.

In the example that the device 100 is configured to plane each of four planar surfaces of the ice ingot 101, the resulting planed ice ingot (e.g., ice ingot 105 or ice ingot 1610) may result in an ice ingot with at least four planar surfaces where each planar surface is substantially perpendicular to a respective adjacent planar surface, as shown in FIG. 1 above and FIG. 16B below. In some embodiments, planing the plurality of surfaces of the ice ingot 101 may result in an ice ingot with at least four planar surfaces shaped to form a parallelogram. For example, an angle of the ice ingot and/or an angle of the cutterheads in the cutting assembly 402 may be adjusted to cut at angles to remove triangular sections rather than rectangular sections of the ice ingot 101. Other angles, shapes and cuts may be configured to plane ice ingot 101 with device 100.

The process 1300 may further include expelling ice chips during the planing of the elongate ice ingot 101. For example, during planing ice chips may be generated and may be expelled in areas surrounding the cutting assembly 402. To avoid marring the surface of the planed ice ingot, the device 100 may include a blower vacuum device (e.g., vacuum 110) to vacuum the ice chips into a collection container (e.g., container 116). The collection container 116 may be configured to melt the ice chips and remove resulting water from the collection container via a drain, as described in detail above.

In some embodiments, the cutting assembly 402 of process 1300 includes at least a first helical cutterhead configured to cut a top plane of the elongate ice ingot, a second helical cutterhead configured to plane a first side plane of the elongate ice ingot, a third helical cutterhead configured to plane a bottom plane of the elongate ice ingot, and a fourth helical cutterhead configured to plane a second side plane of the elongate ice ingot, as described in detail with respect to FIGS. 4A-4C. In some embodiments, the cutting assembly 402 may simultaneously plane the top plane, the bottom plane, the first side plane, and the second side plane of the ice ingot 101 as the ingot 101 is fed through a window/opening between the cutterheads of the cutting assembly 402.

In some embodiments, the planing of the elongate ice ingot 101 may be performed in an environment with an air temperature at or below zero degrees Celsius to ensure the ice ingot 101 does not over melt during processing/planing. In some embodiments, the infeed assembly 102 and the outfeed assembly 104 (and/or surfaces therein) may be configured at a temperature around about zero degrees Celsius or below to avoid such melting during processing. In some embodiments, the planing of the elongate ice ingot 101 may be performed in an environment with an air temperature above about zero degrees Celsius if, for example, portions of the planing assembly 106 and/or cutting assembly 402 are cooled (e.g., refrigerated). For example, the planing assembly 106 may include one or more cooled compartments. In another example, portions of the cutting assembly 402 may be housed in one or more cooled compartments while not in use, for example.

In some embodiments, the process 1300 may produce an article of planed ice (e.g., planed ice ingot 105 or ice 1200 or ice 1610). The raw material used to generate the ice ingot 101 (or ice ingot 1600) may be water. The water is frozen into one or more mold structures and planed with planing device 100 to form a changed appearance and general character of the rough ice into a smoothly planed and shaped ice form, as shown by ice ingot 105 (or ice ingot 1610).

Figure 14:
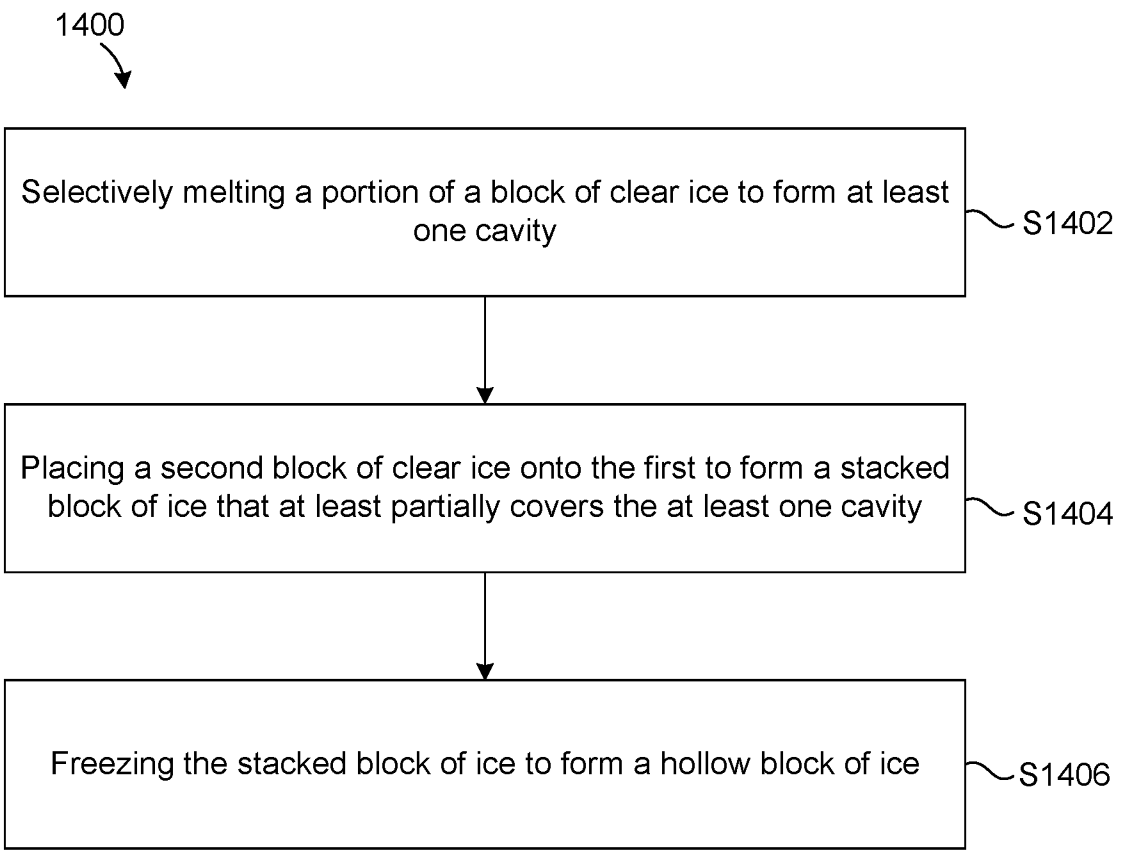
FIG. 14 illustrates a flow diagram of a process to form an augmented block of clear ice.

FIG. 14 illustrates a flow diagram of an example process 1400 to form an augmented block of clear ice. The process 1400 for forming a hollow block of clear includes selectively melting a portion of a block of clear ice to form at least one cavity in block S1402, placing a second block of clear ice onto the first to form a stacked block of ice that at least partially covers the cavity in block S1404, and freezing the stacked block of ice to form a hollow block of ice.

In Step S1402, the process 1400 includes selectively melting a portion of a block of clear ice to form at least one cavity. In some embodiments, the block of clear ice can be an ingot of clear ice produced by an embodiment of the device of FIG. 1 as described herein. In other embodiments, the block of clear ice can be a smaller block of ice, a block of ice having a shape other than an ingot, and/or a block of ice produced by a device other than an embodiment of the device of FIG. 1 as described herein.

In some embodiments, the at least one cavity formed can have a volume of about 75 percent or less of the total volume of starting block of ice. In other embodiments, the cavity formed can have a volume of about 50 percent or less of the total volume of starting block of ice. In still further embodiments, the cavity formed can have a volume of about 25 percent or less of the total volume of starting block of ice. In other embodiments, the cavity can have a volume of about 15 percent or less of the total volume of the starting block of ice. In still other embodiments, the cavity can have a volume of about 5 percent or less of the total volume of the starting block of ice. In further embodiments, the cavity can have a volume of about 2 percent to about 15 percent the total volume of the starting block of ice. In still further embodiments, the cavity can have a volume of about 2 percent to about 10 percent of the total volume of the starting block of ice.

The cavity formed can take on any shape across multiple embodiments. In some embodiments, the cavity has a shape such that is has a cross-sectional shape that is easily recognizable (e.g., a diamond, a heart, a clover, a dime, etc.) to an observer of the block of ice. In other embodiments, the cavity can take the shape of legible text or letters when viewed from a certain perspective. A variety of tools can be used to produce the cavity in the block of ice. In some embodiments, the cavity is formed by a hot brand having a portion analogous to the desired shape of the cavity. For example, the hot brand may be a skewer that is heated and then pressed into the formed ice, using any of the skewer positioning or retracting methods described elsewhere herein. In still other embodiments, an embodiment of the multi-headed heat stamp of FIG. 10A can be employed.

In some embodiments, after a selective melting to produce at least one cavity in a block of clear ice, residual liquid water produced from the selective melting can be at least partially drained from the block. In some embodiments, liquid water filling the newly formed cavity is removed.

At Step S1404, the process 1400 includes placing a second block of clear ice onto the first to form a stacked block of ice that at least partially covers the cavity. In some embodiments, the second block can have the same dimensions as the dimensions of the first block. In other embodiments, the second block can have different dimensions than the first block. In still further embodiments, the second block can include various features, such as cavities of its own. In some embodiments, the second block is stacked manually by hand, although in other embodiments, the second block can be loaded automatically onto the first block by a conveyor system or other mechanism. Although the term "stacked" is used herein to describe the positions of the first and second blocks, one of skill in the art will appreciate that any arrangement of the first and second blocks is functional as long as the cavities are at least partially sealed by their masses of ice.

At Step S1406, the process 1400 includes freezing the stacked block of ice to form a hollow block of ice. This then forms a block of ice at least partially encapsulating a hollow cavity. In some embodiments, the hollow cavity is fully encapsulated by the ice. In embodiments, the resulting hollow block of ice is an ingot of ice containing more than one cavity. In these embodiments, the hollow ingot of ice can be further processed, such as by surface planning and cross-cutting in order to yield a plurality of blocks of ice comprising at least a portion of a cavity. In some embodiments, these cut blocks include at least one fully enclosed cavity.

Figure 15:
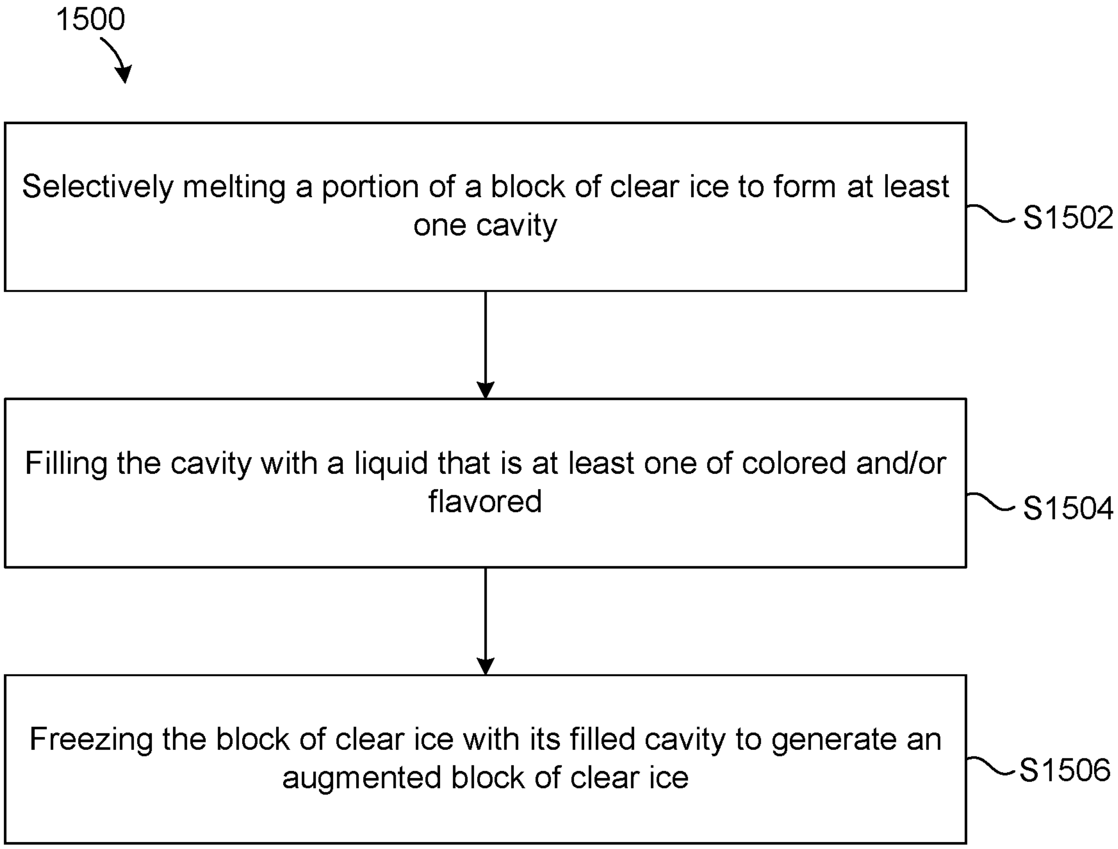
FIG. 15 illustrates a flow diagram of an example process to augment a block of clear ice.

FIG. 15 illustrates a flow diagram for an example process of augmenting a block of clear ice. The process 1500, in one embodiment, includes selectively melting a portion of the block of clear ice to form a cavity in block S1502, filling the cavity with a liquid that is at least one of colored and/or flavored in block S1504, and freezing the block of clear ice with its filled cavity to generate an augmented block of clear ice in block S1506. The process 1500, therefore, operates to produce an aesthetically pleasing block of clear ice that further includes a portion of frozen material that can introduce flavor or color into a drink as the block melts. In some embodiments, the frozen portion of coloring and/or flavoring melts more rapidly than the general mass of clear ice, thereby introducing the coloring and/or flavoring before substantial dilution of the drink can occur.

In Step S1502, the process 1500 includes selectively melting a portion of the block of clear ice to form at least one cavity. In some embodiments, the block of clear ice can be one formed by device 100 or produced by any of the above methods and/or processes. In this manner, it will be appreciated that the block of clear ice in Step S1502 can have any shape, including those other than that of a cube or rectangular prism. In some embodiments, the block of clear ice is an ingot of ice. In some embodiments, the at least one cavity formed in the block of ice by selective melting is small compared to the total volume of the block of ice. In some embodiments, the cavity formed can have a volume of about 25 percent or less of the total volume of starting block of ice. In other embodiments, the cavity can have a volume of about 15 percent or less of the total volume of the starting block of ice. In still other embodiments, the cavity can have a volume of about 5 percent or less of the total volume of the starting block of ice. In further embodiments, the cavity can have a volume of about 2 percent to about 15 percent of the total volume of the starting block of ice. In still further embodiments, the cavity can have a volume of about 2 percent to about 10 percent of the total volume of the starting block of ice. The cavity formed can take on any shape across multiple embodiments.

In some embodiments, the cavity has a shape such that is has a cross-sectional shape that is easily recognizable (e.g., a diamond, a heart, a clover, a dime, etc.) to an observer of the block of ice. A variety of tools can be used to produce the cavity in the block of ice. In some embodiments, the cavity is formed by a hot brand having a portion analogous to the desired shape of the cavity. For example, the hot brand may be a skewer that is heated and then pressed into the formed ice, using any of the skewer positioning or retracting methods described elsewhere herein. In still other embodiments, an embodiment of the multi-headed heat stamp of FIG. 10A can be employed.

In some embodiments, after a selective melting to produce at least one cavity in a block of clear ice, residual liquid water produced from the selective melting can be at least partially drained from the block. In some embodiments, liquid water filling the newly formed cavity is removed.

In Step S1504, the process 1500 includes filling the cavity with a liquid that is at least one of colored and/or flavored. Various colorings and/or flavorings available may be used, including but not limited to, edible dyes, fruit juices, coffee, tea, soft drinks, and various natural and artificial flavors. Similarly, a variety of techniques may be used for filling in the cavity with such a liquid. For example, a skewer may be adapted to dispense a liquid into the cavity after the cavity is formed, using any of the skewer positioning or retracting methods described elsewhere herein.

In Step S1506, the process 1500 includes freezing the block of clear ice with its filled cavity to generate an augmented block of clear ice. In some embodiments, the block of clear ice is frozen in a position to avoid spilling the liquid contents of the cavity. In some embodiments, the block of clear ice is frozen with its filled cavity in a manner to prevent the liquid of the filled cavity from forming a well-organized crystal ice state. In these embodiments, this can therefore enable the frozen coloring and/or flavoring to melt more quickly than the general block of clear ice, allowing for the introduction of the coloring and/or flavoring to a drink before substantial dilution of the drink can occur. Any combination of freezing means may be used to perform this step, such as, but not limited to, placing the block of clear ice with its filled cavity into a standard freezer.

Figure 16A:
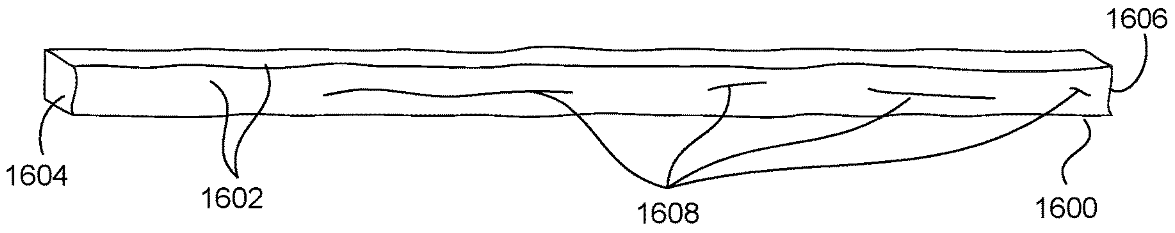
FIGS. 16A-D illustrate an example of an ice ingot processed into an article of ice planed according to the methods described herein.

FIG. 16A illustrates an example of an ice ingot 1600 generated by an ice generating device. For example, the ice ingot 1600 may begin as water or liquid. For example, water or liquid may be used to make a clear ice ingot 1600. The water or liquid may include de-aerated (e.g., gas sweeps, via vacuum, etc.), degassed, purified (e.g., sediment filtered, activated carbon block filtered, granular activated carbon filtered, reverse osmosis filtered, distilled, passed over an ion exchange column, treated with ultraviolet light, ultrafiltered, activated alumina filtered, ionized, etc.), or otherwise treated before being used to make the clear ice ingot 1600. The water or liquid may be from a private well, a municipality, groundwater source, reservoir, etc.

The water or liquid may be placed in at least one elongate trough or flume in thermal communication with one or more reservoirs or lines of circulating coolant or one or more cooling apparatuses (e.g., cooling plate, element, etc.). A flow of water may be provided down at least a portion of the length of the at least one elongate trough during a freezing operation carried out on the water or liquid. The freezing operation may cause clear ice to form on the surface walls of the trough, growing in thickness and filling up to a particular height in the at least one elongate trough. Once an ice ingot (e.g., ice ingot 1600) has been generated within the at least one elongate trough, the freezing operation can be stopped, allowing for the collection of the ice ingot.

The generated ice ingot 1600 includes a number of variations in surface texture, as shown by surfaces 1602 and surfaces 1604 and 1606. In addition, surface occlusions 1608 (e.g., cracking, marring and/or denting) may be present. At some point, it may be desirable to generate an article of ice without such surface occlusions and/or with a different shape than the depicted ice ingot 1600. To do so, the method of FIG. 13 may be carried out to generate an article of ice planed to remove the surface occlusions and to change the shape of the ice ingot 1600.

Figure 16B:
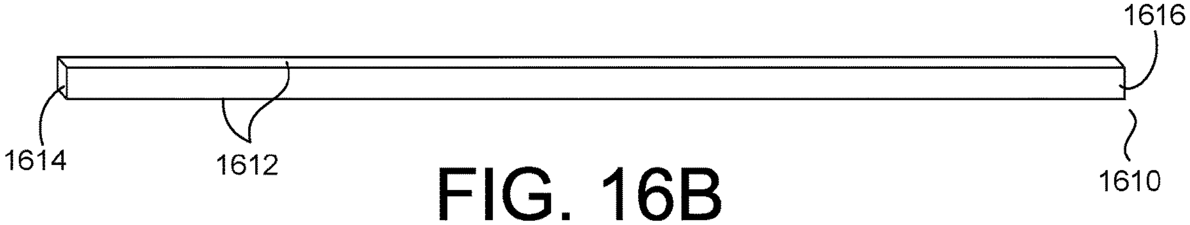
Figure 16C:
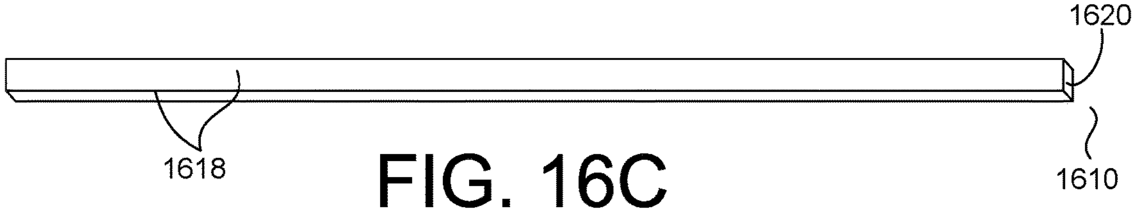
Figure 16D:
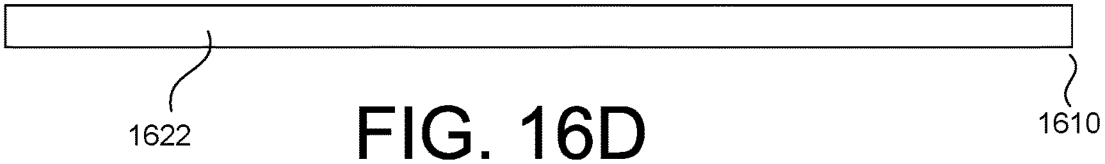

FIG. 16B illustrates an example of an article of ice 1610 planed according to the methods described herein. For example, the process 1300 may be used to produce an article of planed ice (e.g., planed ice ingot 105 or ice 1200 or ice 1610). The raw material used to generate the ice ingot 101 (or ice ingot 1600) may be water or other liquid. The water or liquid is frozen into one or more mold structures and planed with planing device 100 to form a changed appearance and general character of the rough ice into a smoothly planed and shaped ice form, as shown by ice ingot 105 (or ice ingot 1610). For example, surfaces 1602 and 1604 of FIG. 16A are shown without the surface occlusions (e.g., occlusions 1608). In addition, ice ingot 1610 is smoothly planed on each of the surfaces depicted by surfaces 1612, surface 1614, and surface 1616 as well as surfaces 1618, surface 1620 (FIG. 16C) and top surface 1622 (FIG. 16D).

In addition, the ice ingot 1610 is shaped and planed along each of at least four surfaces to generate an elongate ice ingot cube with the at least four planar surfaces being substantially perpendicular to a respective adjacent planar surface. In some embodiments, the ice ingot 1610 is shaped and planed according to process 1300 along each of at least two surfaces to generate an elongate ice ingot cube with the at least two planar that are free from occlusions and shaped to be substantially planar.

In some embodiments, the process of FIG. 14 or the process of FIG. 15 may also be used to generate an article of ice modified from the ice ingot 1600 according to the respective processes described therein. For example, the ice ingot 1600 may be cut on one or more surface (e.g., planed) to generate ice ingot 1600, and may be further processed to generate an augmented block of clear ice from ingot 1610 and/or a hollow block of clear ice from all or a portion of ingot 1610.

The methods of the embodiments and variations described herein can be embodied and/or implemented at least in part as a machine configured to receive a computer-readable medium storing computer-readable instructions. The instructions are preferably executed by computer-executable components preferably integrated with the system and one or more portions of the processor on a computing device in communication with various components of the device for producing clear ice, such as but not limited to its various valves. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

As used in the description and claims, the singular form "a", "an" and "the" include both singular and plural references unless the context clearly dictates otherwise. For example, the term "saw" may include, and is contemplated to include, a plurality of saws. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An ice planing apparatus comprising:

a cutting assembly configured to plane a plurality of surfaces of an ice ingot, the cutting assembly having a plurality of cutterheads mounted to a support form of the ice planing apparatus, the cutting assembly being arranged with a through aperture to receive the ice ingot, and wherein the plurality of cutterheads comprise a first cutterhead configured to cut a top surface of the ice ingot, a second cutterhead configured to plane a first side surface of the ice ingot, a third cutterhead configured to plane a bottom surface of the ice ingot, and a fourth cutterhead configured to plane a second side surface of the ice ingot;

an infeed assembly to deliver the ice ingot to the cutting assembly; and an adjuster means for adjusting the cutting assembly to control a depth of planing of the ice ingot on the plurality of surfaces, wherein the cutting assembly is further configured to etch the ice ingot on one or more of the plurality of surfaces.

2. The apparatus of claim 1, wherein:

the first cutterhead and the third cutterhead are fixed to a support frame of the ice planing apparatus; and the second cutterhead and the fourth cutterhead are configured to be movably located within the ice planing apparatus according to a size of the ice ingot.

3. The apparatus of claim 1, further comprising an ice chip collection system configured to remove ice chips from the cutting assembly during planing of the ice ingot, the ice chip collection system comprising at least:

a vacuum system with a vacuum pipe having a first end fixedly connected to a cyclonic separator and a second end seated adjacent to the cutting assembly; and at least one electronic control to operate the vacuum.

4. The apparatus of claim 3, wherein the ice chip collection system further comprises a collection container at least partially filled with a liquid, the collection container fixedly connected to the cyclonic separator, a water supply, and a drain configured to drain the collection container.

5. The apparatus of claim 1, wherein the infeed assembly houses the ice ingot on a planar surface that is tilted from a normal axis of a working surface used for operating the ice planing apparatus thereon, wherein the infeed assembly further comprises:

an enclosure comprising at least one moveable door for receiving the ice ingot therethrough; and at least one bar feeder assembly configured to push the ice ingot along a planar surface of the infeed assembly into the cutting assembly, the at least one bar feeder assembly being at least a length of the infeed assembly.

6. The apparatus of claim 5, wherein the infeed assembly further comprises:

at least one backstop mechanism configured to exert a force on the ice ingot to maintain a position of the ice ingot between the at least one backstop mechanism and the at least one bar feeder assembly.

7. The apparatus of claim 5, wherein the infeed assembly is configured to receive ice ingots that measure about 0.6 meters to about 2 meters.

8. The apparatus of claim 5, further comprising:

an outfeed assembly spaced from the infeed assembly with the cutting assembly mounted therebetween, the outfeed assembly being configured with an outfeed drive means to guide movement of a planed version of the ice ingot from the cutting assembly.

9. A method of planing ice, the method comprising:

providing an ice planing apparatus, the ice planing apparatus comprising:

a cutting assembly configured to plane a plurality of surfaces of an ice ingot, the cutting assembly having a plurality of cutterheads mounted to a support form of the ice planing apparatus, the cutting assembly being arranged with a through aperture to receive the ice ingot;

an infeed assembly housing the ice ingot on a planar surface that is tilted from a normal axis of a working surface used for operating the ice planing apparatus thereon, the infeed assembly being arranged to deliver the ice ingot to the cutting assembly, wherein the infeed assembly further comprises:

an enclosure comprising at least one moveable door for receiving the ice ingot therethrough; and at least one bar feeder assembly configured to push the ice ingot along a planar surface of the infeed assembly into the cutterhead assembly, the at least one bar feeder assembly being at least a length of the infeed assembly;

an outfeed assembly spaced from the infeed assembly with the cutterhead assembly mounted therebetween, the outfeed assembly being configured to guide movement of a planed version of the ice ingot from the cutterhead assembly; and an adjuster means for adjusting the cutting assembly to control a depth of planing of the ice ingot on the plurality of surfaces, wherein the cutting assembly is further configured to etch the ice ingot on one or more of the plurality of surfaces, wherein the method further comprises:

receiving, at a planing apparatus, an elongate ice ingot;

feeding the elongate ice ingot at a configurable rate through an opening in a cutting assembly of the planing apparatus; and planing, by the cutting assembly, a plurality of surfaces of the elongate ice ingot at a predefined depth as the elongate ice ingot is fed linearly through the opening of the cutting assembly, the planing resulting in a planed ice ingot.

10. The method of claim 9, further comprising:

during the planing of the elongate ice ingot, expelling ice chips, generated by planing the elongate ice ingot, by vacuuming the ice chips into a collection container, the collection container being configured to melt the ice chips and remove resulting water from the collection container via a drain.

11. The method of claim 9, wherein the planing of the plurality of surfaces of the elongate ice ingot is performed simultaneously as the elongate ice ingot is fed through the cutting assembly.

12. The method of claim 9, wherein planing the plurality of surfaces results in an ice ingot with at least four planar surfaces shaped to form a parallelogram.

13. The method of claim 9, wherein the infeed assembly further comprises:

at least one backstop mechanism configured to exert a force on the ice ingot to maintain a position of the ice ingot between the at least one backstop mechanism and the at least one bar feeder assembly.

14. The method of claim 9, wherein the plurality of cutterheads comprise: a first cutterhead configured to cut a top surface of the ice ingot, a second cutterhead configured to plane a first side surface of the ice ingot, a third cutterhead configured to plane a bottom surface of the ice ingot, and a fourth cutterhead configured to plane a second side surface of the ice ingot.

15. An ice planing apparatus comprising:

a cutting assembly configured to plane a plurality of surfaces of an ice ingot, the cutting assembly having a plurality of cutterheads mounted to a support form of the ice planing apparatus, the cutting assembly being arranged with a through aperture to receive the ice ingot; and an infeed assembly to deliver the ice ingot to the cutting assembly;

an adjuster means for adjusting the cutting assembly to control a depth of planing of the ice ingot on the plurality of surfaces, wherein the cutting assembly is further configured to etch the ice ingot on one or more of the plurality of surfaces; and an ice chip collection system configured to remove ice chips from the cutting assembly during planing of the ice ingot, the ice chip collection system comprising at least:

a vacuum system with a vacuum pipe having a first end fixedly connected to a cyclonic separator and a second end seated adjacent to the cutting assembly; and at least one electronic control to operate the vacuum.

16. The apparatus of claim 15, wherein the ice chip collection system further comprises a collection container at least partially filled with a liquid, the collection container fixedly connected to the cyclonic separator, a water supply, and a drain configured to drain the collection container.

17. An ice planing apparatus comprising:

a cutting assembly configured to plane a plurality of surfaces of an ice ingot, the cutting assembly having a plurality of cutterheads mounted to a support form of the ice planing apparatus, the cutting assembly being arranged with a through aperture to receive the ice ingot;

an infeed assembly to deliver the ice ingot to the cutting assembly, wherein the infeed assembly further comprises:

an enclosure comprising at least one moveable door for receiving the ice ingot therethrough; and at least one bar feeder assembly configured to push the ice ingot along a planar surface of the infeed assembly into the cutterhead assembly, the at least one bar feeder assembly being at least a length of the infeed assembly; and an outfeed assembly spaced from the infeed assembly with the cutterhead assembly mounted therebetween, the outfeed assembly being configured to guide movement of a planed version of the ice ingot from the cutterhead assembly; and an adjuster means for adjusting the cutting assembly to control a depth of planing of the ice ingot on the plurality of surfaces, wherein the cutting assembly is further configured to etch the ice ingot on one or more of the plurality of surfaces.

18. The apparatus of claim 17, further comprising:

an ice chip collection system configured to remove ice chips from the cutting assembly during planing of the ice ingot, the ice chip collection system comprising at least:

a vacuum system with a vacuum pipe having a first end fixedly connected to a cyclonic separator and a second end seated adjacent to the cutting assembly; and at least one electronic control to operate the vacuum.

19. The apparatus of claim 18, wherein the ice chip collection system further comprises a collection container at least partially filled with a liquid, the collection container fixedly connected to the cyclonic separator, a water supply, and a drain configured to drain the collection container.

20. The apparatus of claim 17, wherein the infeed assembly further comprises:

at least one backstop mechanism configured to exert a force on the ice ingot to maintain a position of the ice ingot between the at least one backstop mechanism and the at least one bar feeder assembly.

21. The apparatus of claim 17, wherein the plurality of cutterheads comprise: a first cutterhead configured to cut a top surface of the ice ingot, a second cutterhead configured to plane a first side surface of the ice ingot, a third cutterhead configured to plane a bottom surface of the ice ingot, and a fourth cutterhead configured to plane a second side surface of the ice ingot.

* * * * *